(12) United States Patent
Seto et al.

(10) Patent No.: US 6,292,719 B1
(45) Date of Patent: Sep. 18, 2001

(54) INFORMATION SYSTEM FOR VEHICLE

(75) Inventors: Fumio Seto, Kanagawa; Toru Takagi, Yokohama; Naoki Honda, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/562,645

(22) Filed: May 1, 2000

(30) Foreign Application Priority Data

| May 6, 1999 | (JP) | 11-26020 |
| Jul. 9, 1999 | (JP) | 11-196000 |
| Feb. 15, 2000 | (JP) | 12-037159 |

(51) Int. Cl.[7] ............... G06F 17/00; G06F 7/00
(52) U.S. Cl. ............... 701/1; 701/25; 701/65; 701/207; 340/435; 340/992; 342/357.01; 342/357.13; 342/357.17
(58) Field of Search ............... 701/1, 22, 23, 701/25, 35, 65, 207, 214; 342/357.01, 357.09, 357.13, 357.17; 340/435, 438, 439, 992

(56) References Cited

U.S. PATENT DOCUMENTS 5,874,905 * 2/1999 Nanba et al. ............... 340/995
6,076,041 * 6/2000 Watanabe ............... 701/211

FOREIGN PATENT DOCUMENTS 10-332409   12/1998   (JP) .

* cited by examiner

Primary Examiner—William A. Cuchlinski, Jr.
Assistant Examiner—Gertrude Arthur
(74) Attorney, Agent, or Firm—McDermott, Will & Emery

(57) ABSTRACT

An information system of a vehicle has a controller which is arranged to decide a danger point on a traveling road according to a traveling circumstance of the vehicle and to store the danger point for the next travel. The information system informs a driver that the vehicle approaches the danger point stored. Therefore, the information system can provide optimum information according to driver's driving skill to the driver.

20 Claims, 34 Drawing Sheets

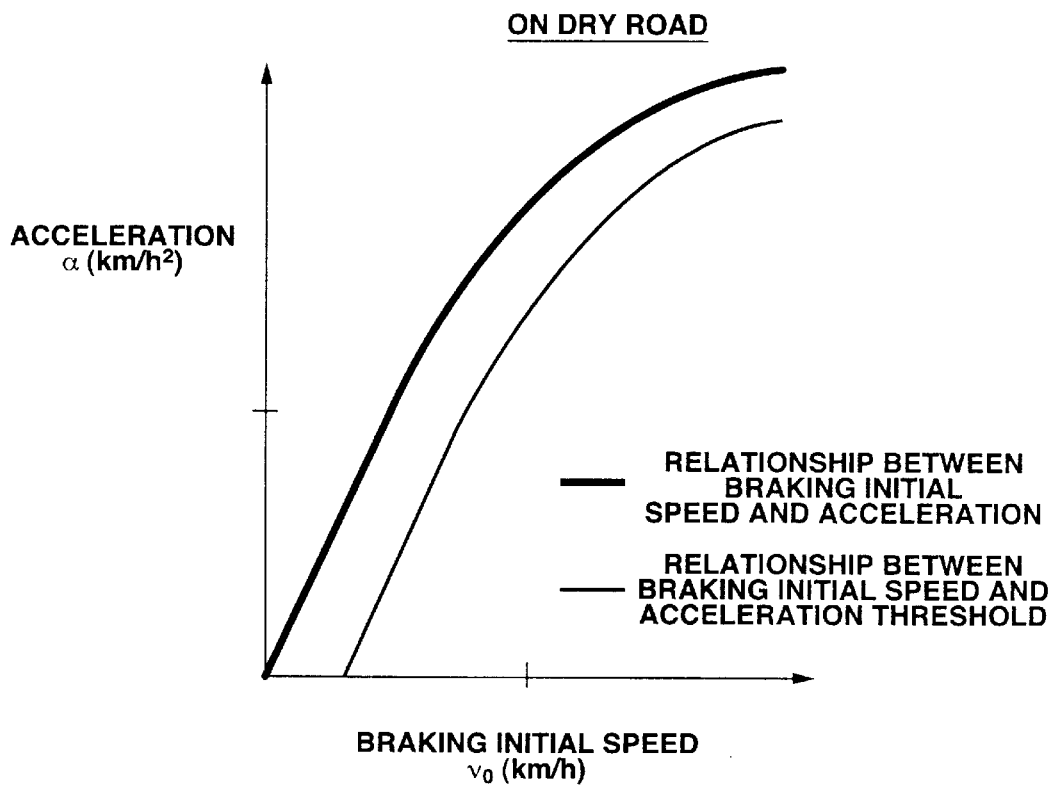
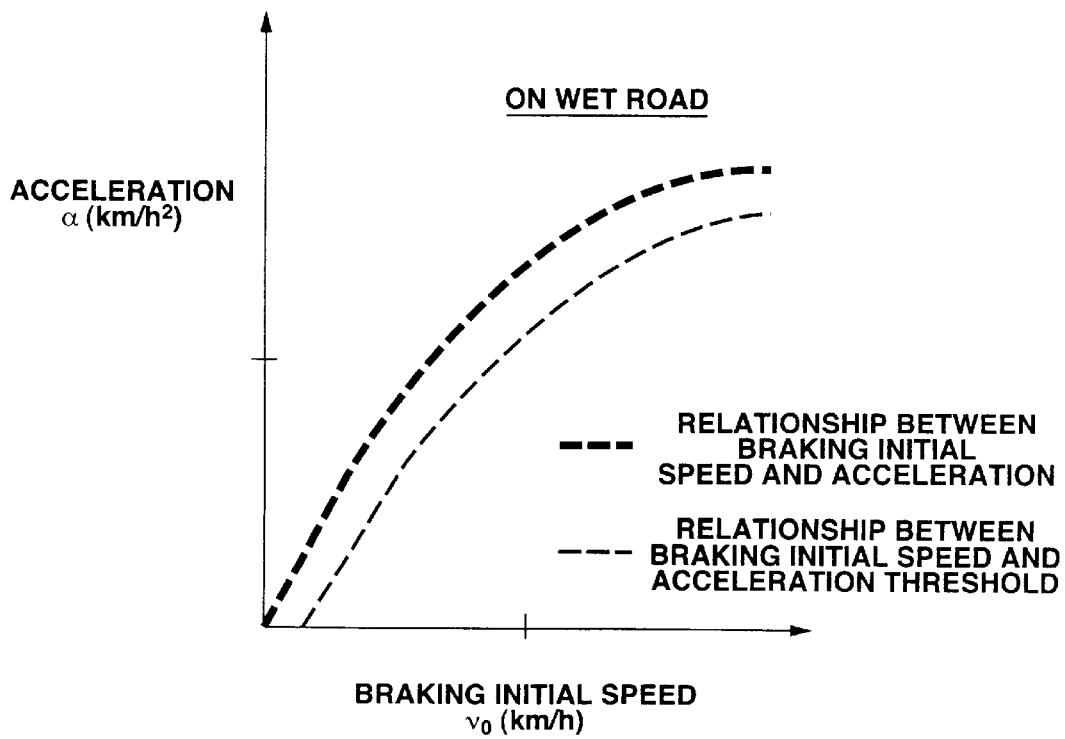

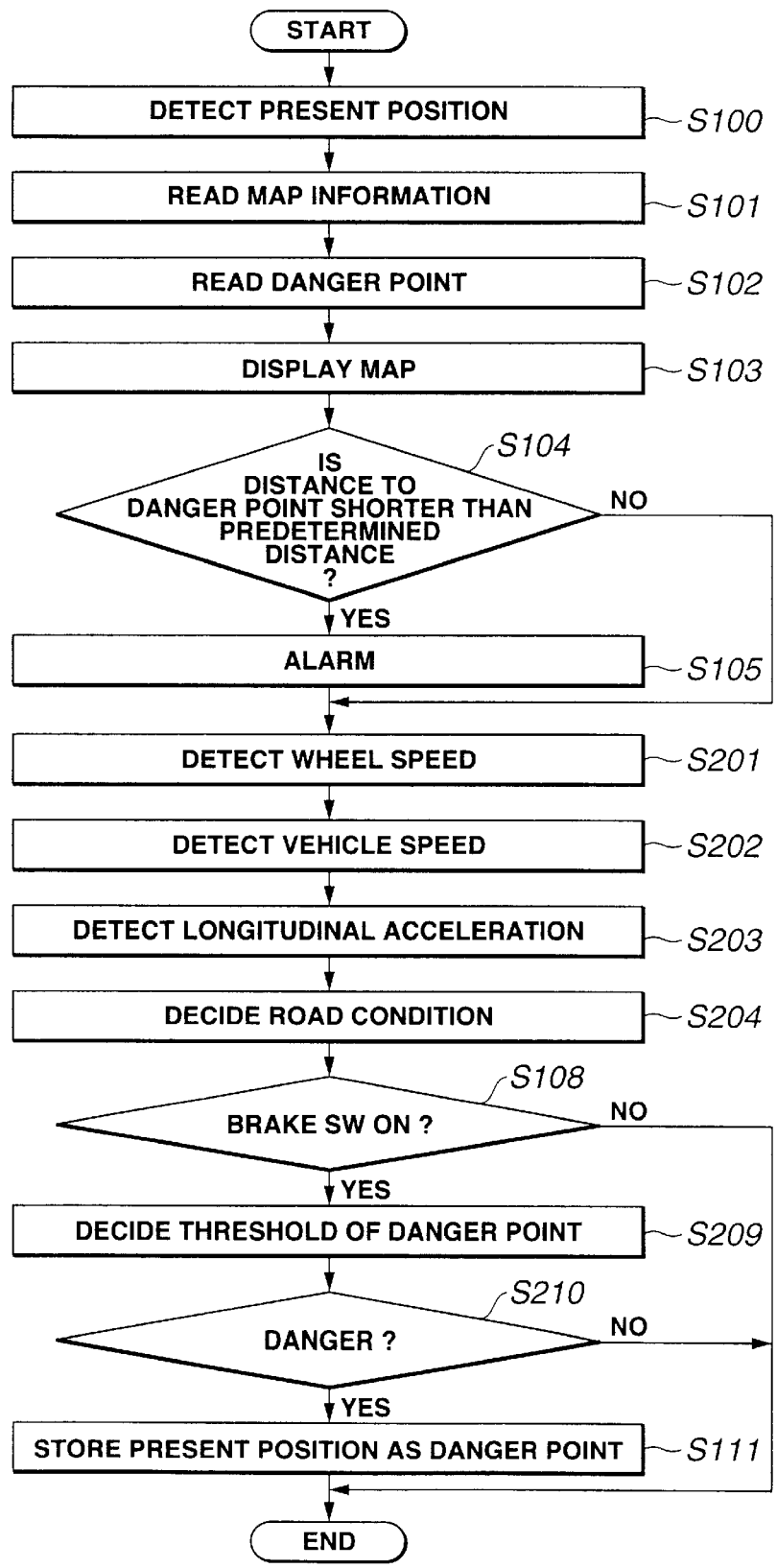

FIG.25
DANGER CONDITION PATTERN
| CASE | ROAD VIEW | VEHICLE SPEED FLUCTUATION | LOCUS CHART | STEER ANGLE FLUCTUATION | DANGER CONDITION |
|---|---|---|---|---|---|
| 1 | 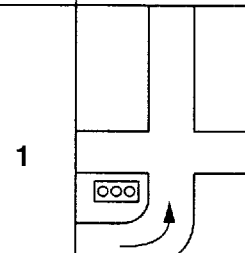 | 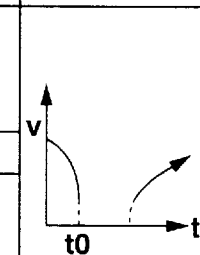 | 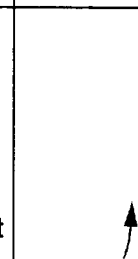 | 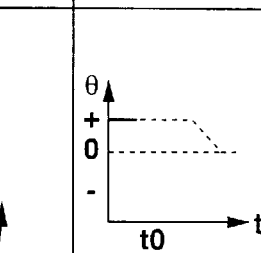 | BAD OUTLOOK NEAR TRAFFIC SIGNAL |
| 2 | 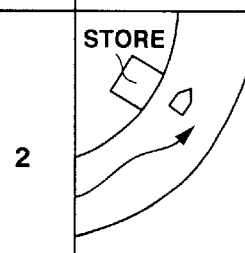 | 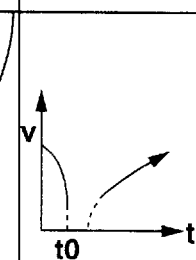 | 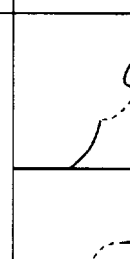 | 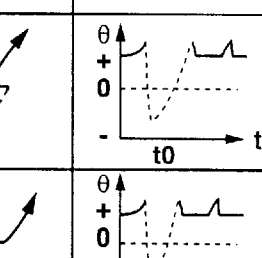 | BAD OUTLOOK NEAR PARKING VEHICLE |
| 3 | 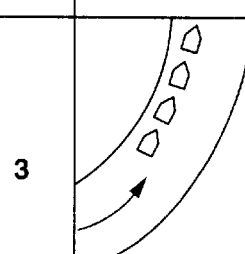 | 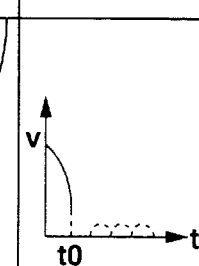 |  | 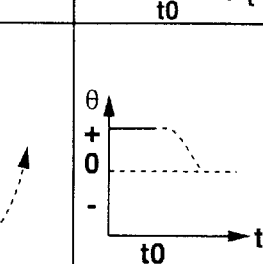 | BAD OUTLOOK NEAR TRAFFIC BACKUP |
| 4 | 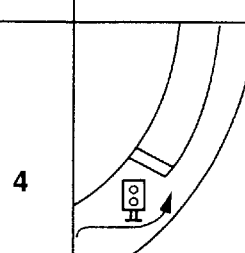 | 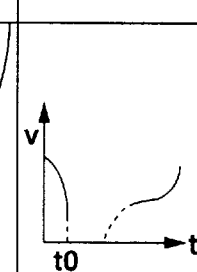 |  | 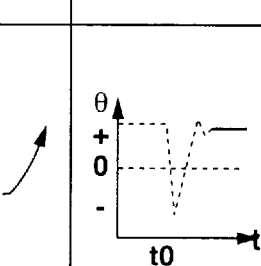 | BAD OUTLOOK NEAR ROAD WORK |

FIG.26
DANGER CONDITION PATTERN
| CASE | ROAD VIEW | VEHICLE SPEED FLUCTUATION | LOCUS CHART | STEER ANGLE FLUCTUATION | DANGER CONDITION |
|---|---|---|---|---|---|
| 5 | 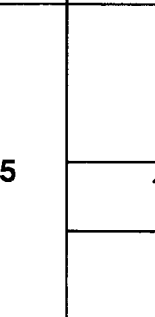 | 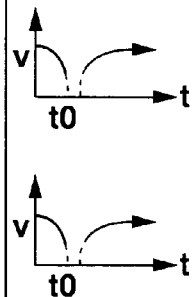 |  | 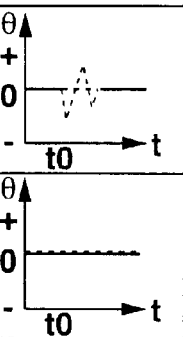 | RUSH OUT |
| 6 | 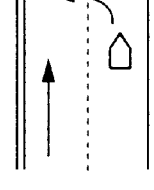 | 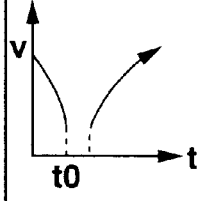 |  | 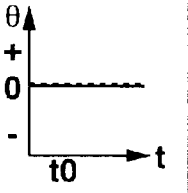 | CUT IN |
| 7 | ? | ? | ? | ? | UNABLE TO DECIDE |

FIG.27

ALARM START PATTERN

| PATTERN | CAUSE OF DANGER CONDITION | SUPPOSED FACTOR | ALARM START DISTANCE |
|---------|---------------------------|-----------------|----------------------|
| PATTERN 1 | QUICK BRAKING ON FLAT STRAIGHT FLAT AND AVOIDING OBSTACLE | DIRT ROAD | 100m SHORT OF DANGER POINT |
| PATTERN 2 | STARTING OF TRAFFIC BACKUP ON FLAT STRAIGHT ROAD | TRAFFIC BACKUP | 100m SHORT OF DANGER POINT |
| PATTERN 3 | QUICK BRAKING ON FLAT STRAIGHT ROAD AND STARTING NORMAL RESTARTING | RUSH OUT | 100m SHORT OF DANGER POINT |
| PATTERN 4 | QUICK BRAKING ON FLAT CURVED ROAD AND AVOIDING OBSTACLE | STOPPING VEHICLE | 300m SHORT TO DANGER POINT |
| PATTERN 5 | QUICK BRAKING ON FLAT CURVED ROAD AND STARTING OF TRAFFIC BACKUP | TRAFFIC BACKUP | 200m SHORT OF DANGER POINT |
| PATTERN 6 | QUICK BRAKING ON FLAT CURVED ROAD AND STARTING NORMAL RUNNING | BAD OUTLOOK NEAR TRAFFIC SIGNAL | 200m SHORT OF DANGER POINT |

FIG.31

DANGER CONDITION PATTER

| CASE | ROAD VIEW | VEHICLE SPEED FLUCTUATION | LOCUS CHART | STEER ANGLE FLUCTUATION | SLOPE RATIO FLUCTRATION | DANGER CONDTION |
|---|---|---|---|---|---|---|
| 1 | | | | | PRESENT SLOPE RATIO ≑0 | BAD OUTLOOK NEAR TRAFFIC SIGNAL |
| 2 | | | | | PRESENT SLOPE RATIO ≑0 | BAD OUTLOOK NEAR PARKING VEHICLE |
| 3 | | | | | PRESENT SLOPE RATIO ≑0 | BAD OUTLOOK NEAR TRAFFIC BUCK UP |
| 4 | | | | | PRESENT SLOPE RATIO ≑0 | BAD OUTLOOK NEAR ROAD WORK |

FIG.32

DANGER CONDITION PATTER

| CASE | ROAD VIEW | VEHICLE SPEED FLUCTUATION | LOCUS CHART | STEER ANGLE FLUCTUATION | SLOPE RATIO FLUCTRATION | DANGER CONDTION |
|---|---|---|---|---|---|---|
| 5 | | | | | PRESENT SLOPE RATIO $\fallingdotseq 0$ | RUSH OUT |
| 6 | | | | | PRESENT SLOPE RATIO $\fallingdotseq 0$ | CUT IN |
| 7 | ? | ? | ? | ? | ? | UNABLE TO DECIDE |
| 8 | | | | | PRESENT SLOPE RATIO $\geq$ THRESHOLD | COMING CLOSE TO CAUSE TRAFFIC ACCIDEAT AT QUICK BRAKING POINT |

FIG.33

ALARM START PATTERN

| PATTERN | CAUSE OF DANGER CONDITION | SUPPOSED FACTOR | ALARM START DISTANCE |
|---|---|---|---|
| PATTERN 7 | QUICK BRAKING ON STRAIGHT DOWNHILL AND AVOIDING OBSTACLE | OBSTACLE, DIRT ROAD | 150m SHORT TO DANGER POINT |
| PATTERN 8 | STARTING TRAFFIC BACKUP ON STRAIGHT DOWNHILL | TRAFFIC BACKUP | 150m SHORT TO DANGER POINT |
| PATTERN 9 | QUICK BRAKING ON STRAIGHT DOWNHILL AND STARTING NORMAL RUNNING | RUSH OUT | 150m SHORT TO DANGER POINT |
| PATTERN 10 | QUICK BRAKING ON CURVED DOWNHILL AND AVOIDING OBSTACLE | STOPPING VEHICLE | 350m SHORT TO DANGER POINT |
| PATTERN 11 | QUICK BRAKING ON CURVED DOWNHILL AND TRAFFIC BACKUP | TRAFFIC BACKUP | 250m SHORT TO DANGER POINT |
| PATTERN 12 | QUICK BRAKING ON CURVED DOWNHILL AND STARTING NORMAL RUNNING | TRAFFIC SIGNAL AHEAD OF CURVED ROAD | 250m SHORT TO DANGER POINT |
| PATTERN 13 | QUICK BRAKING ON STRAIGHT UPHILL AND AVOIDING OBSTACLE | OBSTACLE, DIRT ROAD | 100m SHORT TO DANGER POINT |
| PATTERN 14 | STARTING TRAFFIC BACKUP ON STRAIGHT UPHILL | TRAFFIC BACKUP | 100m SHORT TO DANGER POINT |
| PATTERN 15 | QUICK BRAKING ON STRAIGHT UPHILL AND STARTING NORMAL RUNNING | RUSH OUT | 100m SHORT TO DANGER POINT |
| PATTERN 16 | QUICK BRAKING ON CURVED UPHILL AND AVOIDING OBSTACLE | STOPPING VEHICLE | 300m SHORT TO DANGER POINT |
| PATTERN 17 | QUICK BRAKING ON CURVED UPHILL AND TRAFFIC BACKUP | TRAFFIC BACKUP | 200m SHORT TO DANGER POINT |
| PATTERN 18 | QUICK BRAKING ON CURVED UPHILL AND STARTING NORMAL RUNNING | BAD OUTLOOK NEAR TRAFFIC SIGNAL | 200m SHORT TO DANGER POINT |

INFORMATION SYSTEM FOR VEHICLE

BACKGROUND OF THE INVENTION

The present invention relates an information system which informs a driver that a traveling vehicle is approaching a danger point.

Japanese Patent Provisional Publication No. (TOKUKAIHEI) 10-332409 discloses a conventional information system which informs previously-stored bad places for traffic accidents to a vehicle driver.

SUMMARY OF THE INVENTION

However, this conventional information system is arranged to previously store various information as to traffic accidents and to inform the stored information to the driver. Since the validity of such information varies according to driver's skill in driving, some drivers of high driving skill feel the information to be too much and some other drivers of low driving skill feel the information to be too little.

It is therefore an object of the present invention to provide an improved information system which provides optimum information according to driver's skill in driving to a driver.

An information system according to the present invention is for a vehicle and comprises a position detector, a traveling circumstance detector and a controller. The position detector detects a position of the vehicle with respect to the Earth. The traveling circumstance detector detects circumstantial information of the vehicle. The controller is connected to the position detector and the traveling circumstance detector. The controller is arranged to decide whether a quantity indicative of the circumstantial information of the vehicle is greater with a circumstance threshold, to store the position of the vehicle as a stored point when the controller decides that the quantity indicative of the circumstantial information is greater than the circumstance threshold, to decide whether a distance between the position of the vehicle and the stored point is shorter than a predetermined distance, and to output information indicative that the vehicle approaches the stored point when the controller decides that the distance is shorter than the predetermined distance.

BRIEF DESCRIPTION OF THE DRAWINGS

In the drawings, same reference numerals denote same parts and elements throughout all figures.

FIG. 8A is a graph showing a relationship between a braking initial speed and an acceleration of the vehicle and a relationship between the braking initial speed and a threshold on a dry road.

FIG. 8B is a graph showing a relationship between a braking initial speed and an acceleration of the vehicle and a relationship between the braking initial speed and a threshold on a wet road.

FIG. 10 is a flowchart showing a control operation of the navigation system of the second embodiment according to the present invention.

FIG. 25 is a table showing typical patterns of a danger point.

FIG. 26 is a table showing other typical patterns of a danger point.

FIG. 27 is a table showing typical alarming patterns according to the road surface condition.

FIG. 31 is a table showing typical patterns of a danger point.

FIG. 32 is a table showing other typical patterns of a danger point.

FIG. 33 is a table showing typical alarming patterns according to the road surface condition.

DETAILED DESCRIPTION OF THE INVENTION

With reference to drawings, preferred embodiments according to the present invention will be discussed. The following embodiments are described as to an information system according to the present invention adapted to a navigation system for an automotive vehicle.

First Embodiment

Referring to FIGS. 1 to 4, there is shown a first embodiment of a navigation system 100 including an information system according to the present invention.

Figure 1:
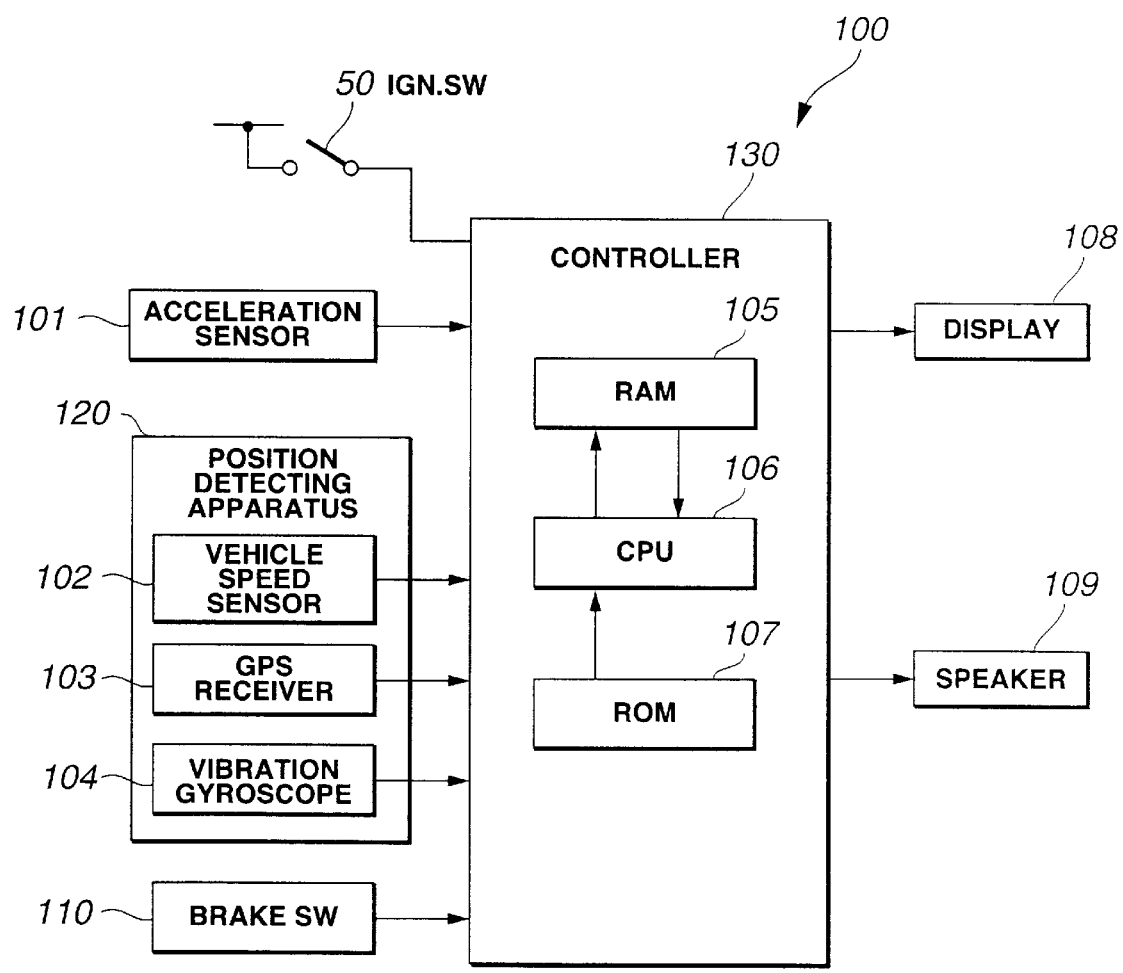
FIG. 1 is a schematic view showing a basic construction of a navigation system of a first embodiment according to the present invention.

As shown in FIG. 1, the navigation system 100 comprises a controller 130, a present position detecting apparatus 120, a display 108 and a speaker 109. The navigation system 100 is installed to a vehicle and is arranged to receive electric power from a battery (not shown) to the controller 130 and other devices when an ignition switch (IGN-SW) 50 is turned on by a manner of inserting an ignition key into a key cylinder and turning the key.

The present position detecting apparatus 120 comprises a vehicle speed sensor 102, a global positioning system (GPS) receiver 103, and a vibration gyroscope 104. An acceleration sensor 101 is connected to the controller 130, detects an acceleration (deceleration) in the longitudinal direction of the vehicle and outputs a signal indicative of the longitudinal acceleration data to the controller 130.

The vehicle speed sensor 102 constituting the present position detecting apparatus 120 is connected to the controller 130. The vehicle speed sensor 102 detects a vehicle speed by utilizing a wheel speed sensor installed to a driven wheel of the vehicle and outputs a signal indicative of the vehicle speed to the controller 130.

The GPS receiver 103 receives radio-waves from GPS satellites for measuring positions through a GPS antenna and calculates a present position of the vehicle with respect to the Earth and a traveling direction of the vehicle with respect to the Earth and sends information including the present position and the traveling direction to the controller 130. If the condition for receiving radio-wave is bad, it is difficult to detect the position of the vehicle by means of the GPS receiver 103. Under such a bad condition in receiving radio-wave, the position detecting apparatus 120 obtains the present position and the traveling direction of the vehicle by means of a known accumulative calculating method on the basis of the traveling direction detected by the vibration gyroscope 104 and the vehicle speed data and outputs the obtained data indicative of the present position and the traveling direction of the vehicle to the controller 130.

The controller 130 basically comprises a CPU 106, a RAM 105, a ROM 107 and a peripheral device (not shown). The RAM 105 stores data indicative of danger points decided by the controller 130 and outputs the data of the danger points to the CPU 106 according to a command from the CPU 106. The ROM 107 has stored road map data including place name, kind of road, road name, road shape, and mapped date indicative of a relationship between a braking initial speed and an acceleration (deceleration) of the vehicle, which relationship corresponds to a graph shown in FIG. 3. The ROM 107 is connected to a scale select switch (not shown) for setting a scale of the road map.

The controller 130 is further connected to a display 108 which displays the road map, the present position of the vehicle and the danger points, and a speaker 109 which outputs alarm and/or alarming information on the basis of the data generated by the CPU 106. Furthermore, the controller 130 is connected to a brake switch (brake SW) 110 which is turned on when a driver depresses a brake pedal (not shown).

Next, the manner of determining a danger point threshold for deciding a danger point will be discussed with reference to FIGS. 2 and 3.

Figure 2:
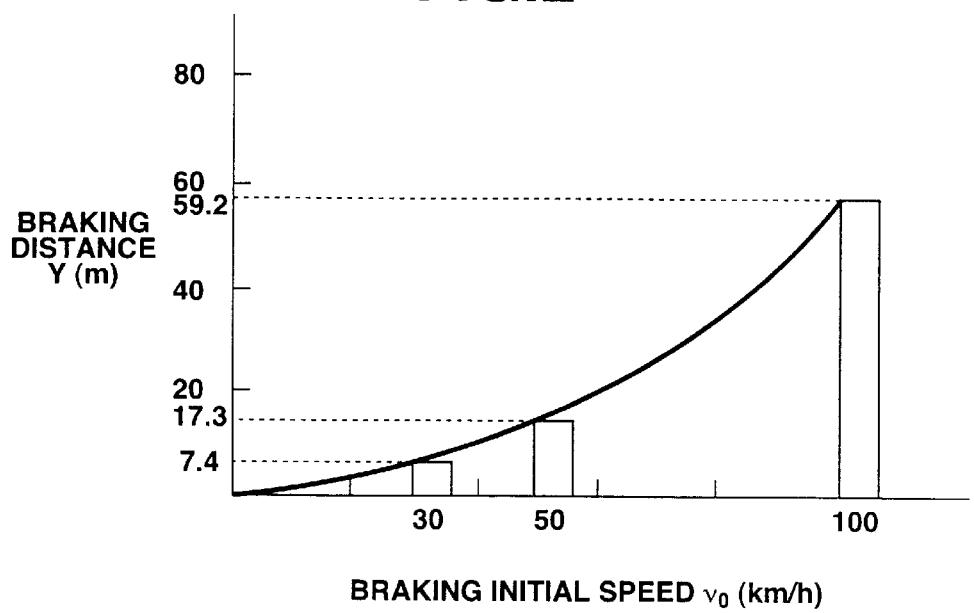
FIG. 2 is a graph showing a relationship between a braking initial speed and a braking distance.

FIG. 2 shows a relationship between a braking initial speed and a braking distance. The braking initial speed is a vehicle speed at the time when a driver starts braking due to a danger feeling on a predetermined road surface condition. As is clear from a graph of FIG. 2, the braking distance becomes long according to the increase of the braking initial speed.

If it is defined that an aimed vehicle speed is v, the braking initial speed $v_0$, an acceleration (deceleration) $\alpha$ and the braking distance Y, the following equation (1) is established.

$$v^2 - v_0^2 = 2 \times \alpha \times Y \qquad (1)$$

In this embodiment, it is arranged such that when the driver executes quick braking so as to stop the vehicle it is decided that such a stopped point is a danger point. Therefore, the aimed vehicle v is generally set at 0, and by substituting v=0 to the equation (1) the following equation (2) is obtained.

$$-v_0^2 = 2 \times \alpha \times Y \qquad (2)$$

An acceleration (deceleration) $|\alpha|$ is derived from the equation (2) as follows:

$$|\alpha| = -v_0^2 / (2 \times Y). \qquad (3)$$

Figure 3:
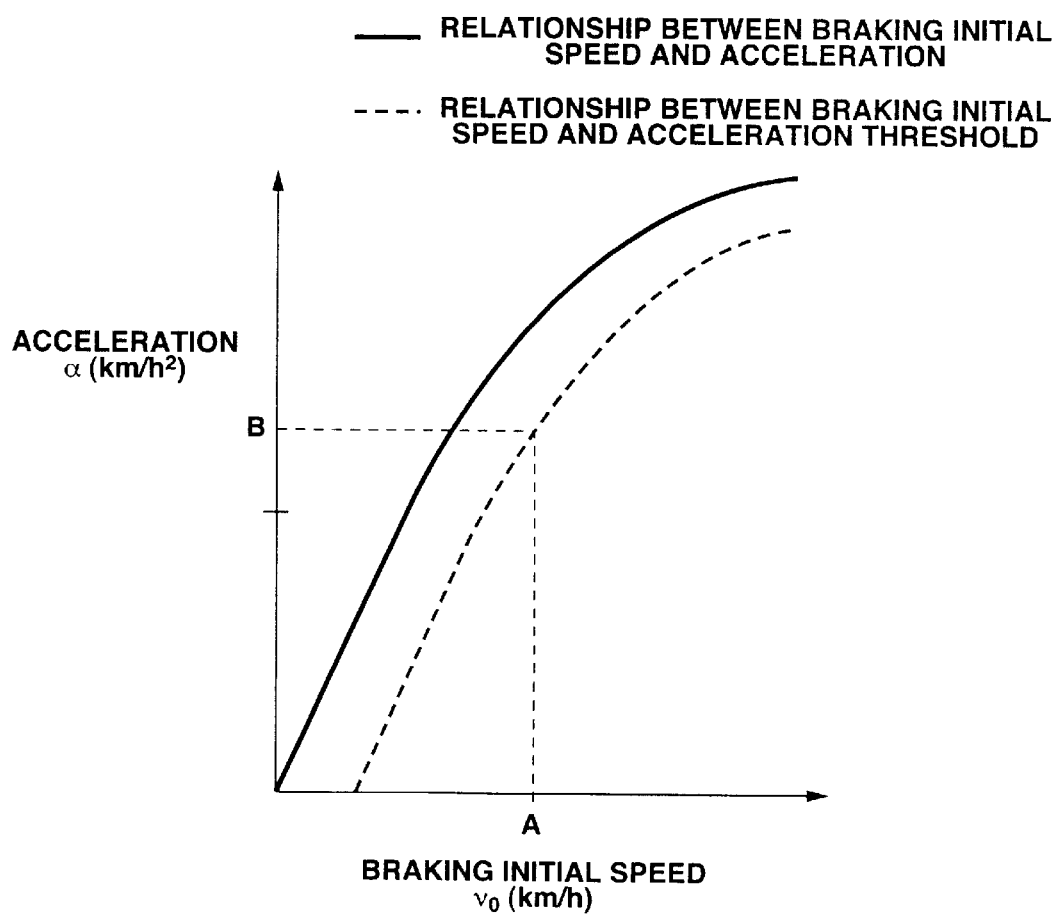
FIG. 3 is a graph showing a relationship between the braking initial speed and an acceleration of the vehicle.

By substituting the braking initial speed $v_0$ and the braking distance Y into the right side of the equation (2), a quadric curve shown by a continuous line of FIG. 3 is drawn. In this graph, the acceleration $\alpha$ is represented by an absolute value to clearly show the relationship between the acceleration and the braking initial speed. The continuous line shown in FIG. 3 represents an ideal relationship between the braking initial speed $v_0$ and the acceleration (deceleration) $\alpha$, and therefore even if the brake pedal is further depressed, the acceleration (deceleration) is almost not varied. Accordingly, the danger point threshold αth(v) corresponding to the braking initial speed v is determined from the acceleration (deceleration) αmax(v) according to the braking initial speed (v) and a previously set value β(v) previously set according to the braking initial speed (v) as follows:

$$\alpha th(v)=\alpha max(v)-\beta(v) \quad 0<\beta(v). \tag{4}$$

As is clear from the equation (4), the danger point deciding threshold αth(v) is set at a value which smaller than an ideal acceleration (deceleration) αmax(v) by β(v) according to the braking initial speed (v). A map representative of a relationship among the threshold αth(v), the braking initial speed $v_0$ and the acceleration (deceleration) α has been previously stored in the ROM 107.

Figure 4:
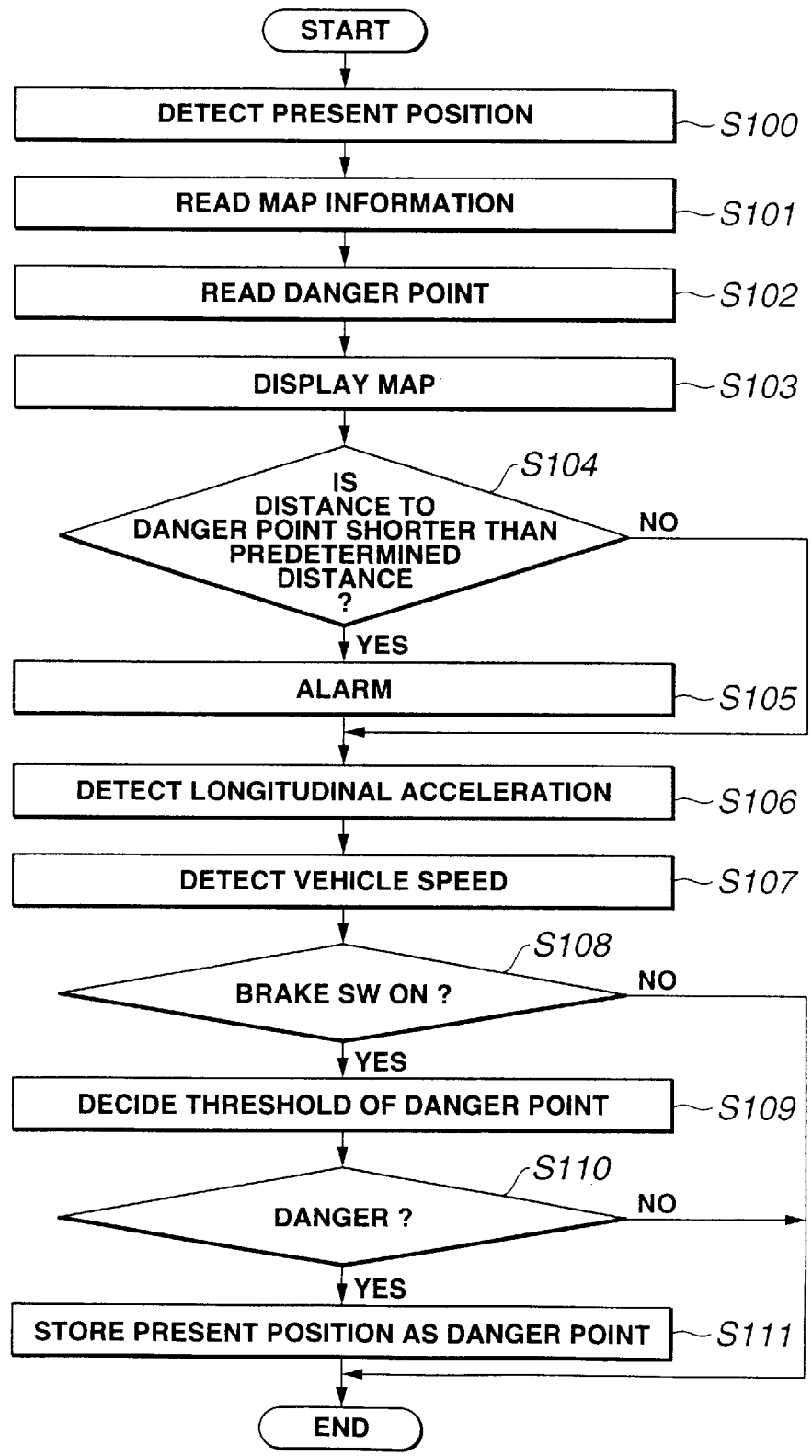
FIG. 4 is a flowchart showing a control operation of the navigation system of the first embodiment according to the present invention.
Figure 5:
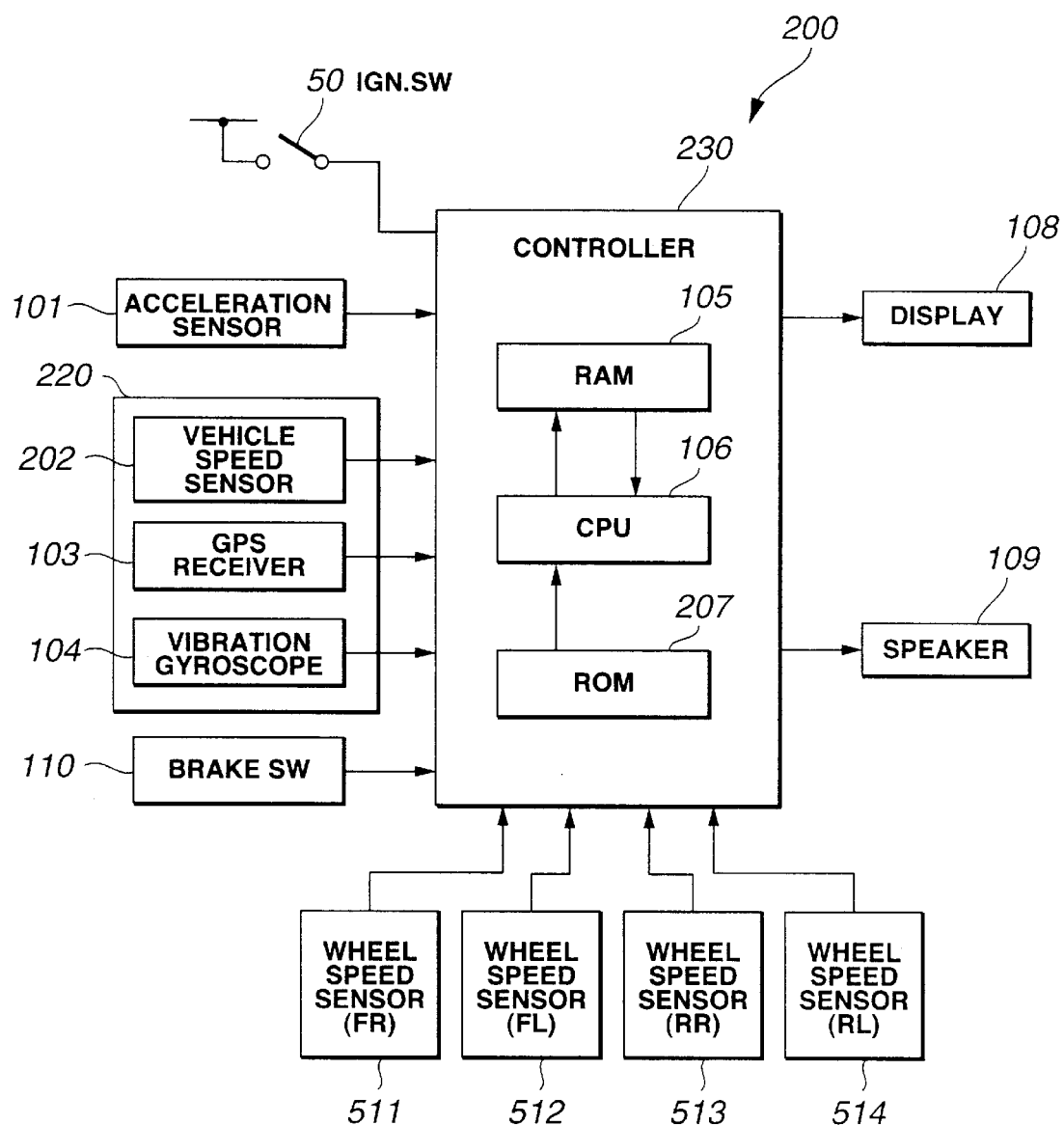
FIG. 5 is a schematic view showing a basic construction of the navigation system of a second embodiment according to the present invention.

With reference to a flowchart of FIG. 4, the control operation executed by the controller 130 of the navigation system 100 of the first embodiment according to the present invention will be discussed. This control is started according to the turning-on of the IGN-SW 50 and is repeated at predetermined intervals (50 msec).

At a step S100, the controller 130 executes reading the present position and the traveling direction of the vehicle to the CPU 106, on the basis of data indicative of the present position and the traveling direction detected by the present position detecting apparatus 120.

At a step S101, the controller 130 executes reading the road map data indicative of an area including the present position of the vehicle to the CPU 106 according to one of several scales previously selected by the scale select switch.

At a step S102, the controller 130 executes reading the danger position data stored in the RAM 105 to the CPU 106.

At a step S103, the controller 130 displays a mark representative of the present position and the traveling direction, the map data and a mark representative of the danger point on the display 108.

At a step S104, the controller 130 calculates a distance between the present position and the danger point and decides whether or not the distance to the danger point is shorter than or equal to a reference distance 100 m. In this step, the controller 130 further decides whether the vehicle has passed the danger point or not. Only when the vehicle is traveling toward the danger point, the decision as to the distance to the danger point is executed. When the decision at the step S104 is affirmative, the routine proceeds to a step S105 wherein the controller 130 informs that the vehicle is traveling toward the danger point by outputting an alarm information signal to the speaker 108. The speaker 108 outputs alarms or alarming announce in reply to the alarm information signal from the controller 130. When the decision at the step S104 is negative, the routine jumps to a step S106.

At the step S106 following to the execution of the step S105 or the negative decision at the step S104, the controller 130 executes reading the longitudinal acceleration (deceleration) of the vehicle from the acceleration sensor 101 to the CPU 106.

At a step S107, the controller 130 executes reading the vehicle speed from the vehicle speed sensor 102 to the CPU 106.

At a step S108, the controller 130 decides whether the brake switch 110 is turned on or not. When the decision at the step S108 is affirmative, the routine proceeds to a step S109. When the decision at the step S108 is negative, that is, when the controller 130 decides the vehicle continues normal traveling, the routine jumps to an end block to terminate the present routine.

At the step S109, the controller 130 determines the danger point threshold from the detected vehicle speed and the data indicative of a relationship between the vehicle speed and the danger point threshold which relationship has been stored in the RAM 105. More specifically, when the present vehicle speed set as the braking initial speed is A km/h, the danger point threshold is set at A km/h$^2$ as shown in FIG. 3.

At a step S110, the controller 130 compares the danger point threshold determined at the step S109 and the longitudinal acceleration (deceleration) read at the step S106 to decide whether the vehicle is encountering the danger condition. When the longitudinal acceleration (deceleration) is greater than the danger threshold, the controller 130 decides that the vehicle is now encountering the danger condition. More specifically, the controller 130 decides whether the longitudinal acceleration (deceleration) of the vehicle is greater than the danger point threshold. When the decision at the step S110 is affirmative, the routine proceeds to a step S111. When the decision at the step S110 is negative, the routine jumps to the end block to terminate the present routine.

At the step S111, the controller 130 stores the present position of the vehicle as a danger point in the RAM 105. Then, the present routine is terminated.

As described above, the first embodiment is arranged to detect the longitudinal acceleration of the vehicle by means of the acceleration sensor 101 and to determine the danger point by comparing the detected longitudinal acceleration and the danger point threshold and to store the danger point in the RAM 105 when the detected longitudinal acceleration is greater than the danger point threshold. Therefore, it becomes possible to display the danger point in the display 108 and to inform the driver that the danger point is coming soon by means of alarming. Various danger points have been stored in the controller 130 by each vehicle, and therefore the navigation system can provide the information as to the danger points adjustably to the driver of the corresponding vehicle. As a result, the driver can drive the vehicle so as to properly correspond to the various danger points.

Although the present invention has been shown and described to employ the acceleration sensor 101, it will be understood that an acceleration sensor employed in an airbag system may be used instead of the acceleration sensor 101. This reduces the production cost of the information system. Furthermore, although the first embodiment has been shown and described such that the danger point is displayed on the road map by the execution of the step S103, it will be understood that it may be arranged to display the danger point on the road map together with the alarm process of the step S105 only when the danger point is located ahead of the present position on the traveling road at the step S104.

Second Embodiment

Referring to FIGS. 5 to 10, there is shown a second embodiment of the navigation system including the information system according to the present invention.

A basic construction of the second embodiment is basically the same as that of the first embodiment. The same elements are denoted by the same reference numerals of the first embodiment and therefore the explanation thereof is omitted herein. The second embodiment is characteristically arranged to comprise four wheel speed sensors 511, 512, 513 and 514 in addition to the vehicle speed sensor 202. A controller 230 of the second embodiment is further arranged to estimate a road surface condition on the basis of rotation speeds of four wheels FR, FL, RR and RL, detected by the vehicle speed sensor 202 and the respective wheel speed sensors 511 to 514, and to vary the danger point threshold of the longitudinal acceleration according to the road surface condition.

The vehicle speed sensor 202 is installed to a differential gear (not shown) and detects a vehicle speed of the vehicle. The vehicle speed sensor 202 is connected to the controller 230 and outputs a signal indicative of the vehicle speed to the controller 230. The wheel speed sensor 511 to 514 are installed to a front right (FR) wheel, a front left (FL) wheel, a rear right (RR) wheel and a rear left (FR) wheel, respectively.

The ROM 207 of the second embodiment is arranged to store maps representative of relationship between the danger point threshold of the longitudinal acceleration and the braking initial speed shown in FIGS. 8A, 8B, 9A and 9B. The maps have been prepared and stored in correspond to the road surface conditions in the Rom 207.

With reference to FIGS. 6, 7 and 8A–9B, a determining algorism of the danger point threshold for determining the danger point will be discussed.

Figure 6:
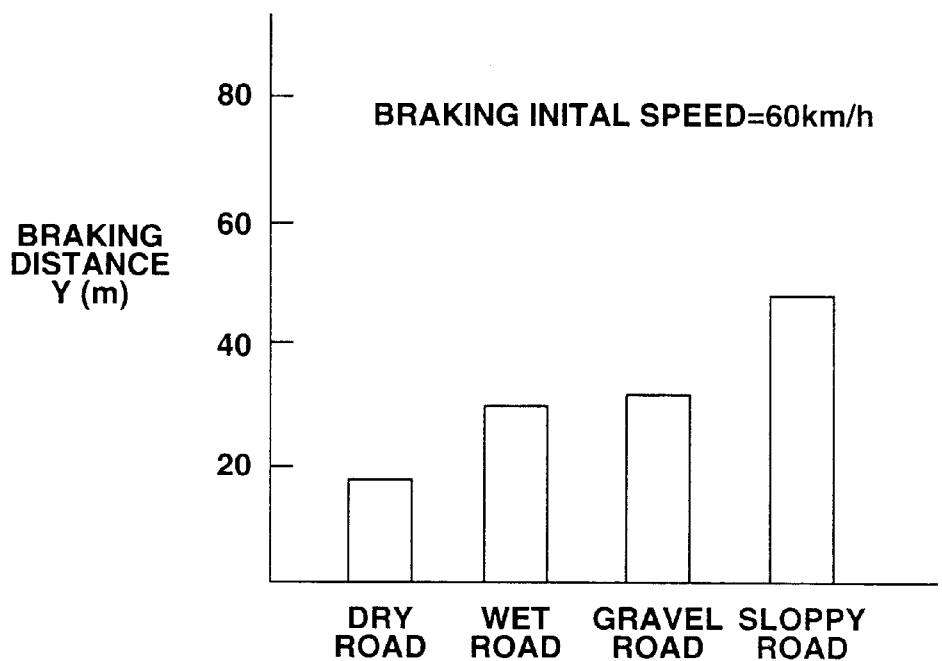
FIG. 6 is a graph showing braking distances at 60 km/h of the braking initial speed on four typical road surface conditions.
Figure 7:
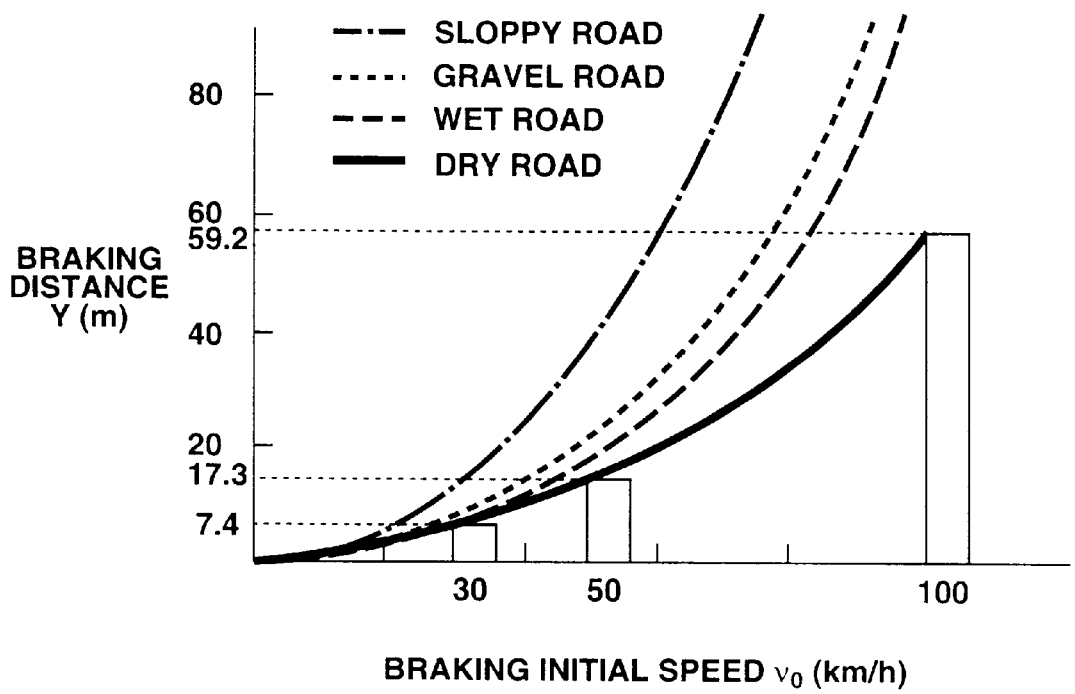
FIG. 7 is a graph showing relationships between the braking distance and the braking initial speed according to the road surface condition.
Figure 9A:
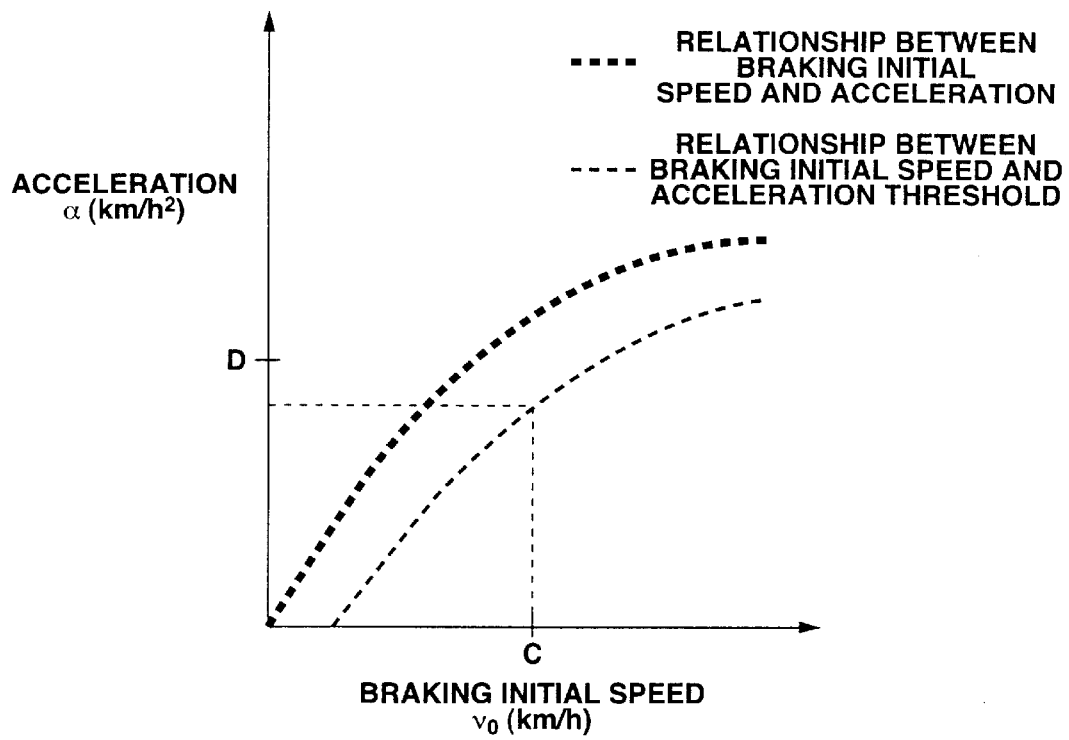
FIG. 9A is a graph showing a relationship between a braking initial speed and an acceleration of the vehicle and a relationship between the braking initial speed and a threshold on a gravel road.
Figure 9B:
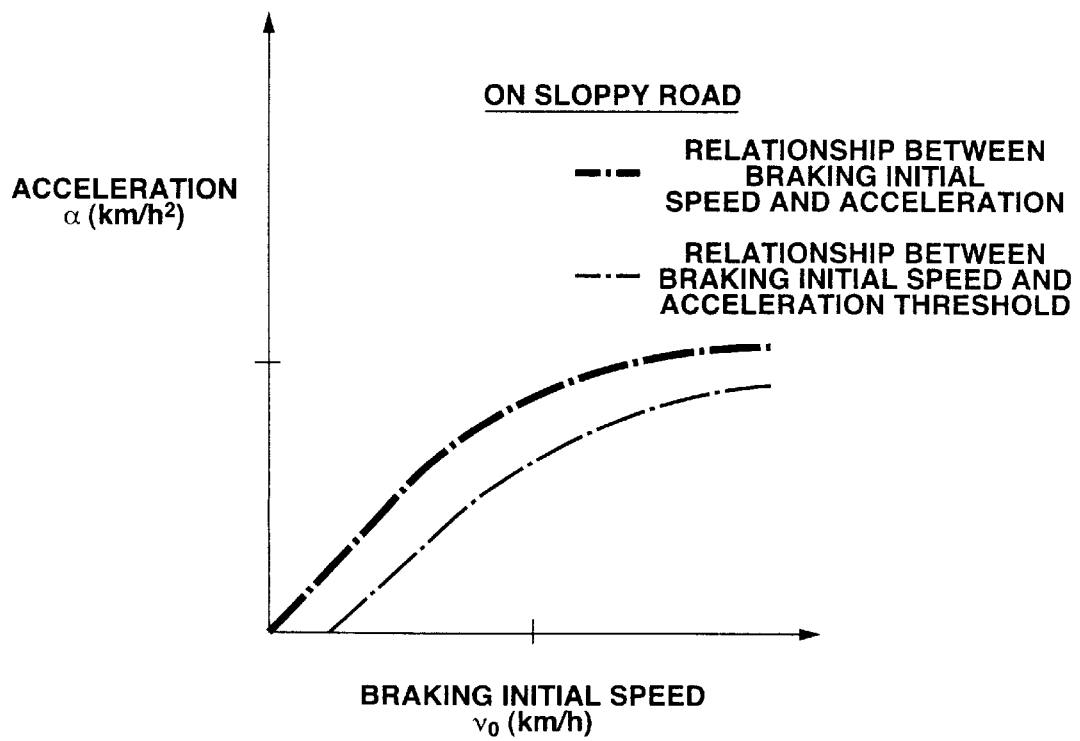
FIG. 9B is a graph showing a relationship between a braking initial speed and an acceleration of the vehicle and a relationship between the braking initial speed and a threshold on a sloppy road.

FIG. 6 shows a graph showing the braking distance Y at the braking initial speed 60 km/h with respect to four typical road surface conditions. FIG. 7 shows a graph showing a relationship between the braking distance Y and the braking initial speed v0 according to the road surface condition. FIGS. 8A, 8B, 9A and 9B show the respective relationships between the braking initial speed and the threshold of the acceleration (deceleration) by each of four typical road surface conditions.

Generally, the braking distance varies according to the road surface condition. That is, as shown in FIG. 6, the braking distance of the vehicle traveling at 60 km/h on a gravel road generally becomes 2 times that of the vehicle traveling at 60 km/h on a dry road, and the braking distance of the vehicle traveling at 60 km/h on a sloppy road general becomes 3 times that of the vehicle traveling at 60 km/h on a dry road. Therefore, it is supposed that the relationship between the braking distance Y and the braking initial speed $v_0$ according to the road surface condition forms a quadric curve where the slope of the braking distance takes larger value according to the sliding degree of the road. More specifically, the siding degree of the road is large in the order of a sloppy road, a gravel road, a wet road and a dry road.

By substituting the braking initial speed $v_0$ and the braking distance Y according to the road surface condition into the equation (3), the quadric curves are obtained as shown in FIGS. 8A, 8B, 9A and 9B. As is clear from these figures, the slope of the acceleration (deceleration) a of the curve becomes great in the order of the dry road, the wet road, the gravel road and the sloppy road. These curves show idealistic relationship between the braking initial speed and the acceleration (deceleration) when the brake pedal is depressed to the limit. Accordingly, even if the brake pedal is further depressed, the acceleration (deceleration) in each road surface condition does not vary largely. Therefore, the danger point threshold is determined at a value which is smaller than the threshold at the time when the brake pedal is idealistically depressed in each road surface condition.

Next the manner of the estimation method of the road surface condition will be discussed. In this embodiment, it is supposed that a front-wheel drive vehicle is employed in this embodiment.

(1) On the basis of the rotation speeds of the front right wheel and of the front left wheel, a difference therebetween is calculated.

(2) Similarly, on the basis of the rotation speeds of the rear right wheel and of the rear left wheel, a difference therebetween is calculated.

(3) By comparing the difference calculated at (1) and the difference calculated at (2), a friction coefficient $\mu$ of the vehicle with respected to a traveling road.

(4) By comparing the friction coefficient $\mu$ with a road condition threshold for deciding the road surface condition, the road surface condition is estimated. More specifically, the friction coefficient $\mu$ is compared with the three thresholds $\mu 1$, $\mu 2$ and $\mu 3$ which has a relationship of $\mu 1 < \mu 2 < \mu 3$. According to the magnitude of the friction coefficient $\mu$, the road surface condition is estimated as follows.

When $\mu > \mu 3$, it is decided that the vehicle travels on a dry road.

When $\mu 2 < \mu \leq \mu 3$, it is decided that the vehicle travels on a wet road.

When $\mu 1 < \mu \leq \mu 2$, it is decided that the vehicle travels on a gravel road.

When $\mu \leq \mu 3$, it is decided that the vehicle travels on a sloppy road.

Next, with reference to a flowchart shown in FIG. 10, the manner of control operation of the navigation system 200 will be discussed. The control flowchart shown in FIG. 10 includes a basic procedure similar to that of FIG. 4. The same steps are denoted by the same reference numerals, and the explanation thereof is omitted herein. Further, it is of course that the ROM 207 has previously stored this control flowchart in the form of a control program.

At a step S201 after the execution of the basic steps 100 to S105, the controller 230 executes reading the rotation speed of each of the four wheels FR, FL, RR and RL from the wheel speed sensors 511 to 514 to the CPU 106.

At a step S202, the controller 230 executes reading the vehicle speed from the vehicle speed 202 to the CPU 106.

At a step S203, the controller 230 executes reading the longitudinal acceleration from the acceleration sensor 101 to the CPU 106.

At a step S204, the controller 230 executes the decision of the road surface condition by means of the above described estimation method.

At the step S108 following to the execution of the step S204, the controller 230 decides whether the brake switch 110 is turned on or not. When the decision at the step S108 is affirmative, the routine proceeds to a step S209. When the decision at the step S108 is negative, that is, when the controller 230 decides that there is no danger point, the routine jumps to an end block to terminate the present routine.

At the step S209, the controller 230 determines the present danger point threshold from the present vehicle speed detected at the step S202, the road surface condition decided at the step S204 and the mapped data representative of the relationship between the vehicle speed and the threshold, which is stored in the RAM 105. For example, when the controller 230 decides at the step S204 that the vehicle is traveling on a gravel road and when the detected vehicle speed is C(km/h), the controller 230 employs a map representative of the relationship of FIG. 9A and determines that the danger point threshold is D(km/h$^2$).

At a step S210, the controller 230 compares the danger point threshold determined at the step S209 and the longitudinal acceleration read at the step S203. More specifically, the controller 230 decides whether or not the acceleration read at the step S203 is greater than the threshold determined at the step S209. When the decision at the step S210 is affirmative, that is, when the controller 230 decides that the vehicle is traveling at the danger point, the routine proceeds to the step S111 wherein the controller 230 stores the present position as a danger point in the RAM 105. When the decision at the step S210 is negative, that is, when the controller 230 decides that the vehicle does not travel at the danger point, the routine jumps to the end block to terminate the present routine.

With the thus arranged second embodiment, the danger point is determined and stored according to the road surface condition. Therefore, it becomes possible to store the danger point upon taking account of the road surface condition in addition to the advantages gained by the first embodiment.

Third Embodiment

Figure 11:
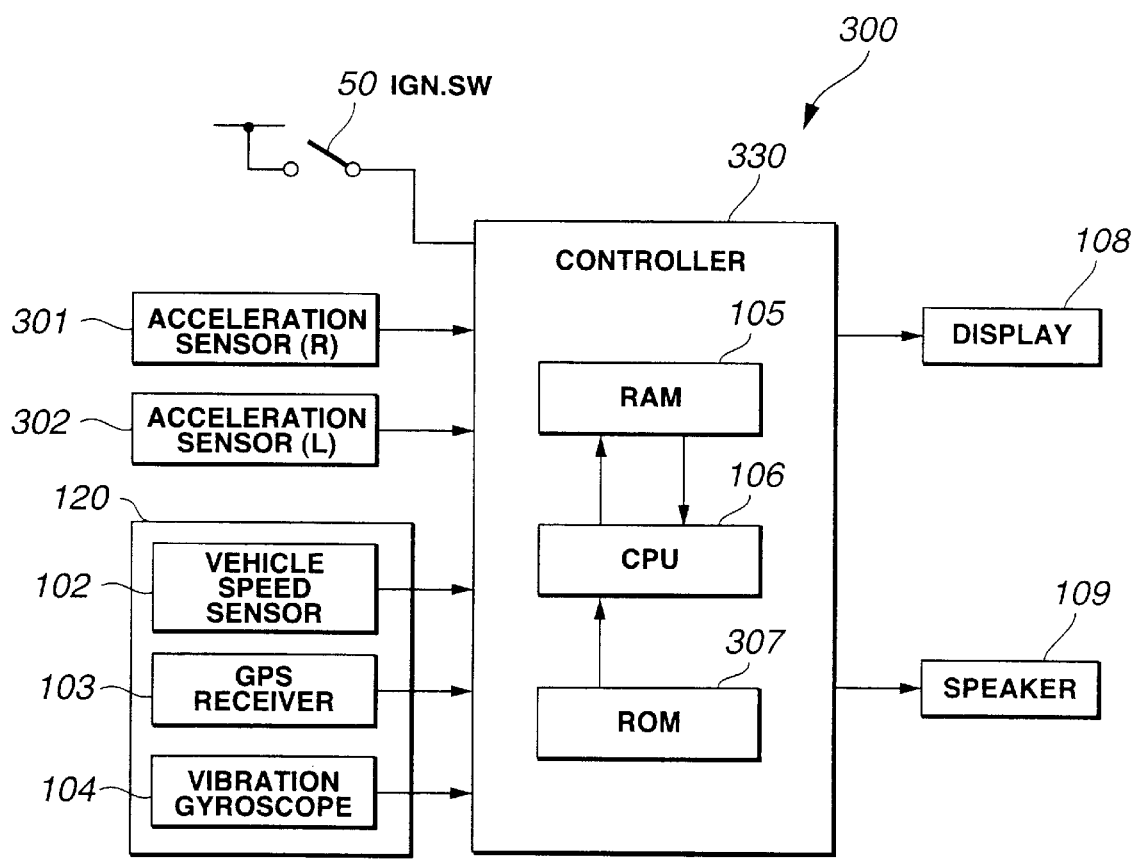
FIG. 11 is a schematic view showing the basic construction of the navigation system of a third embodiment according to the present invention.
Figure 12:
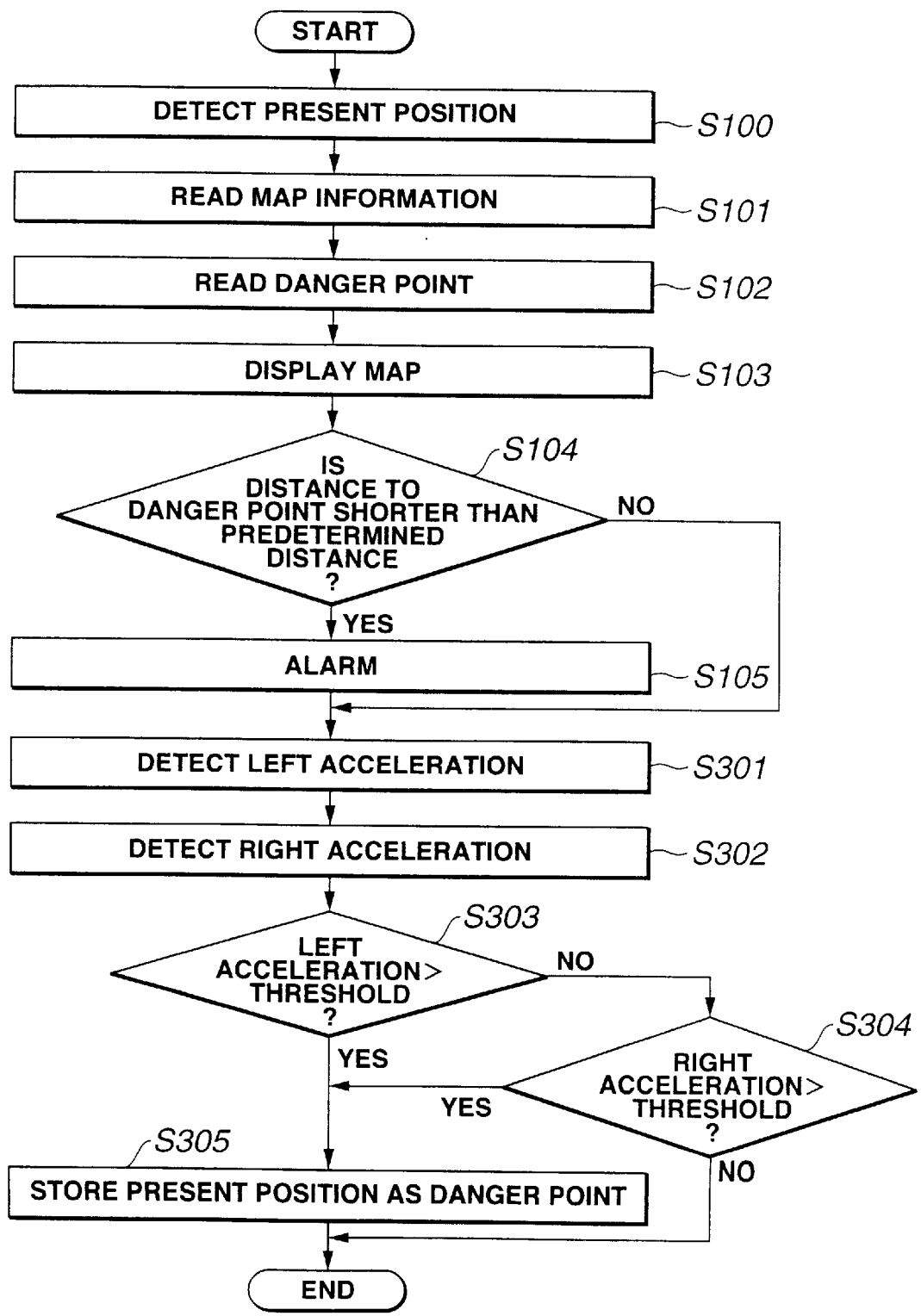
FIG. 12 is a flowchart showing a control operation of the navigation system of the third embodiment according to the present invention.

Referring to FIGS. 11 and 12, there is shown a third embodiment of the navigation system including the information system according to the present invention.

The basic construction of the third embodiment is generally the same as that of the first embodiment except that a right side acceleration sensor 301 and a left side acceleration sensor 302 are provided instead of the acceleration sensor 101. Further, a ROM 307 is provided instead of the ROM 107 and is arranged to store maps representative of relationships as to the respective right and left accelerations and the braking initial speed. The right side acceleration sensor 301 is installed at a right side of the vehicle and detects a lateral acceleration (acceleration directed to a right side direction of the vehicle) at the right side of the vehicle. Similarly, the left side acceleration sensor 302 is installed at a left side of the vehicle and detects a lateral acceleration (acceleration directed to a left side direction of the vehicle) at the left side of the vehicle. The third embodiment is arranged to decide a danger point by comparing the right and left accelerations with a common threshold.

With reference to a flowchart shown in FIG. 12, the manner of control operation of the navigation system of the third embodiment will be discussed. The control flowchart shown in FIG. 12 includes a basic procedure similar to that of FIG. 4. The same steps are denoted by the same reference numerals, and the explanation thereof is omitted herein. Further, it is of course that the ROM 307 has previously stored this control flowchart in the form of a control program.

At a step S301 after the execution of the basic steps 100 to S105, the controller 330 executes reading data indicative of the left directional acceleration from the left side acceleration sensor 302 to the RAM 105.

At a step S302, the controller 330 executes reading data indicative of the right directional acceleration from the right side acceleration sensor 301 to the RAM 105.

At a step S303, the controller 330 decides whether or not the left directional acceleration is greater than the common threshold. When the decision at the step S303 is affirmative, that is, when the left side longitudinal acceleration is greater than the common threshold, the routine proceeds to a step S305. When decision at the step S303 is negative, that is, when the left directional acceleration is not greater than the common threshold, the routine proceeds to a step S304.

At the step S304, the controller 330 decides whether or not the right directional acceleration is greater than the common threshold. When the decision at the step S303 is affirmative, that is, when the left directional acceleration is greater than the common threshold, the routine proceeds to a step S305. When decision at the step S303 is negative, that is, when the left directional acceleration is not greater than the common threshold, the routine proceeds to an end block to terminate the present routine.

At the step S305, the controller 330 stores the present position as a danger point into the RAM 105, and thereafter terminates the present routine.

With the thus arranged third embodiment, it becomes possible to store the present position as a danger point when the lateral acceleration becomes larger than the common threshold. Therefore, it becomes possible to store a point where quick turning operation of the vehicle was executed to avoid a danger condition, as a danger point.

Fourth Embodiment

Figure 13:
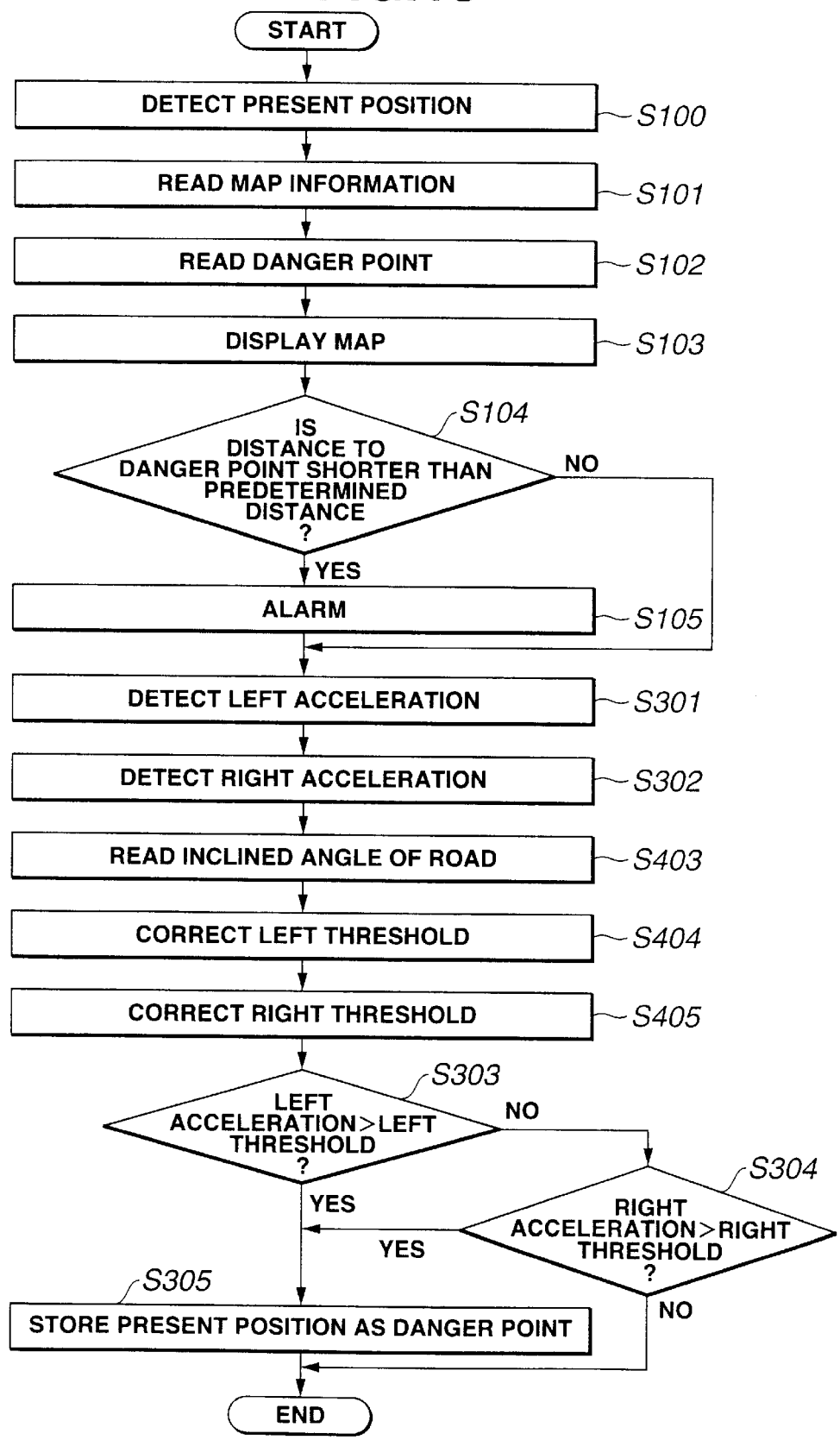
FIG. 13 is a flowchart showing a control operation of the navigation system of a fourth embodiment according to the present invention.

Referring to FIG. 13, a fourth embodiment of the navigation system including the information system according to the present invention will be discussed. The basic construction of the fourth embodiment is generally the same as that of the third embodiment shown in FIG. 11. Therefore, the explanation of the basic construction of the fourth embodiment is omitted herein. The fourth embodiment is characteristically arranged to correct the right and left sides lateral acceleration thresholds on the basis of the right and left directional slope (a slope in the lateral direction of the vehicle) with respect to the traveling road, which slopes are previously stored in the ROM 307.

With reference to a flowchart shown in FIG. 13, the manner of control operation of the fourth embodiment will be discussed. The flowchart of FIG. 13 includes the basis steps which are the same as those of the flowchart of FIG. 12, and these steps are denoted by the same reference numerals. Therefore, the explanation thereof is omitted herein. Further, it is of course that the flowchart of FIG. 13 has been previously stored in the ROM 307 in the form of a control program.

At a step S403 after the execution of the steps S100 to S105, S301 and S302, the controller 430 of the fourth embodiment extracts data indicative of right and left directional slope of the traveling road from road slope data previously stored in the ROM 307 on the basis of the present position detected at the step S100.

At a step S404, the controller 430 obtains a correction value of the left threshold from the left threshold stored in the ROM 307 and the right and left directional slope data. That is, when the vehicle is inclined so that the left side is lower in height level than the right side, the left threshold is corrected to take a larger value according to the right and left directional slope data. In contrast, when the vehicle is inclined so that the right side is lower in height level than the left side, the left threshold is corrected to take a smaller value according to the right and left directional slope data.

At a step S405, the controller 430 obtains a correction value of the right threshold from the right threshold stored in the ROM 307 and the right and left directional slope data. That is, when the vehicle is inclined so that the right side is lower in height level than the left side, the right threshold is corrected to take a larger value according to the right and left directional slope data. In contrast, when the vehicle is inclined so that the right side is lower in height level than the left side, the right threshold is corrected to take a larger value according to the right and left directional slope data.

At a step S406 following to the execution of the step S405, the controller 330 decides whether or not the left directional acceleration is greater than the corrected left threshold corrected at the step S404. When the decision at the step S303 is affirmative, that is, when the left directional acceleration is greater than the left threshold, the routine proceeds to a step S305. When the decision at the step S303 is negative, that is, when the left directional acceleration is not greater than the corrected left threshold, the routine proceeds to a step S407.

At the step S407, the controller 330 decides whether or not the right directional acceleration is greater than the corrected right threshold corrected at the step S405. When the decision at the step S406 is affirmative, that is, when the left directional acceleration is greater than the corrected right threshold, the routine proceeds to a step S305. When decision at the step S406 is negative, that is, when the left directional acceleration is not greater than the corrected right threshold, the routine proceeds to an end block to terminate the present routine.

At the step S305, the controller 430 stores the present position as a danger point into the RAM 105, and thereafter terminates the present routine.

With the thus arranged information system of the fourth embodiment according to the present invention, when the vehicle is inclined laterally so that the left side is lower in height level than the right side, the left threshold is corrected to a larger value and the right threshold is corrected to a smaller value. Further, when the vehicle is inclined laterally so that the right side is lower in height level than the left side, the right threshold is corrected to a smaller value and the left threshold is corrected to a larger value. This enables adaptive correction of the threshold according to the lateral slope of the traveling road.

Fifth Embodiment

Figure 14:
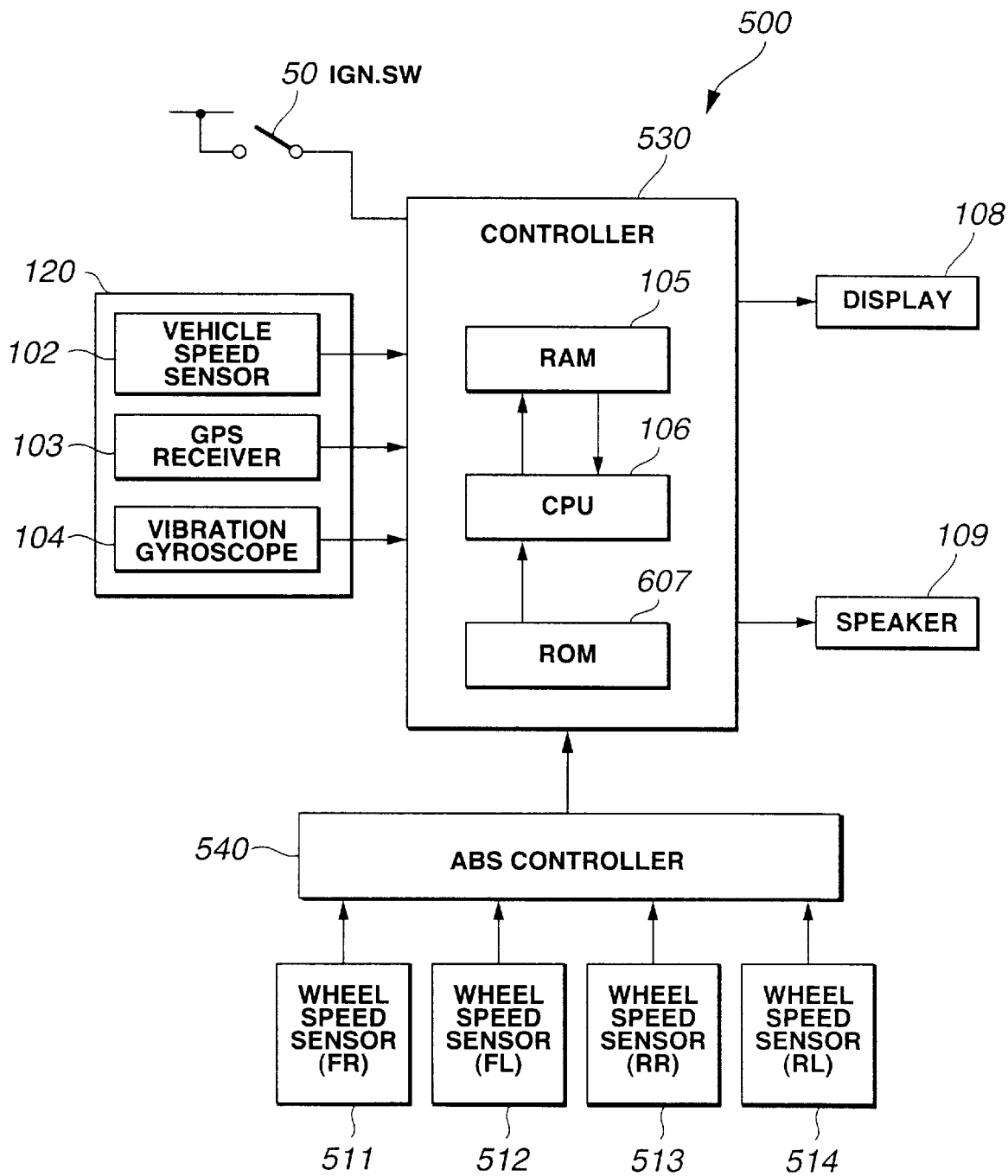
FIG. 14 is a schematic view showing the basic construction of the navigation system of a fifth embodiment according to the present invention.
Figure 15:
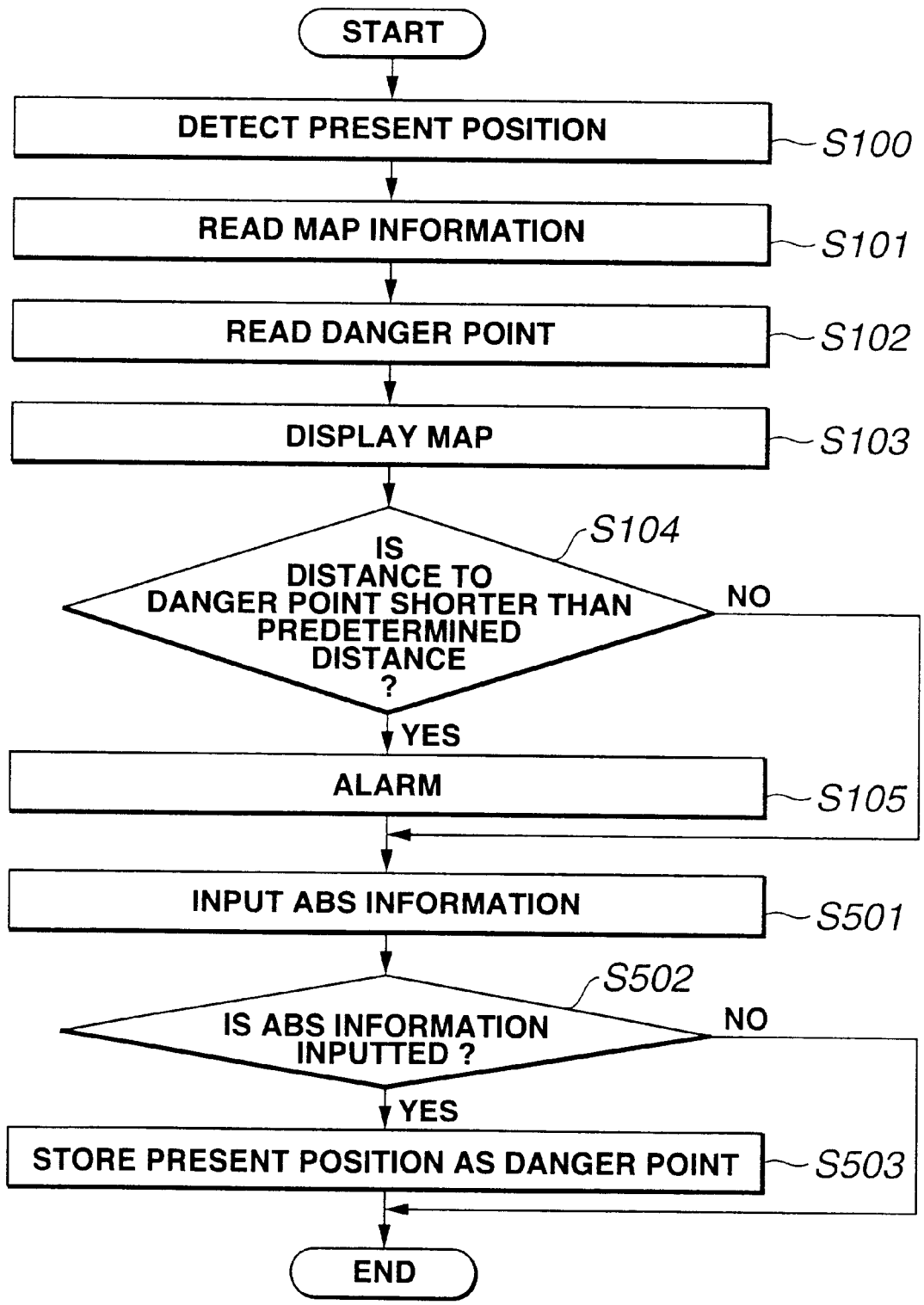
FIG. 15 is a flowchart showing a control operation of the navigation system of the fifth embodiment according to the present invention.

Referring to FIGS. 14 and 15, there is shown a fifth embodiment of the navigation system including the information system according to the present invention. The basic construction of the fifth embodiment is generally the same as that of the first embodiment shown in FIG. 1, and the same elements are denoted by the same reference numerals of the first embodiment. Therefore, the explanation of the basic construction is omitted herein. The fifth embodiment is characteristically arranged to comprise the wheel speed sensors 511, 512, 513 and 514 and an anti-lock brake system (ABS) controller 540, and to decide a point where the ABS controller 540 operates as a danger point. The operation of the ABS controller 540 is decided on the basis of the rotation speeds of the wheel speed sensors 511 to 514. The wheel speed sensors 511 to 514 are installed to the front right wheel (FR), the front left wheel (FL), the rear right wheel (RR) and the rear left wheel (RL), respectively and detect the rotations speeds thereof, respectively. Further, the wheel speed sensors 511 to 514 output signals indicative of the respective wheel rotation speeds to the ABS controller 540, respectively.

The ABS controller 540 executes a known brake hydraulic control on the basis of the wheel speed data sent from the wheel speed sensors 511 to 514. When the ABS controller 540 is operating to execute the brake hydraulic control, it sets ABS information at 1 and sends the ABS information to the controller 530 of the navigation system 500. When the ABS controller 540 is not operating, it sets the ABS information at 0 and sends the ABS information set at 0 to the controller 530.

Next, with reference to the flowchart of FIG. 15, the manner of control operation of the navigation system according to the fifth embodiment will be discussed. The basic steps of the fifth embodiment are generally the same as those of the first embodiment shown in FIG. 4. Therefore, the explanation of the basic construction of the fifth embodiment is omitted herein. Further, it is of course that the flowchart of FIG. 15 has been previously stored in the ROM 507 in the form of a control program.

At a step S501 after the execution of the basic steps S100 to S105, the controller 530 receives the ABS information from the ABS controller 540.

At a step S502, the controller 530 checks whether the ABS information is set at 1 or not. When the decision at the step S502 is affirmative the routine proceeds to a step S503.

When the decision at the step S502 is negative, the routine jumps to an end block to terminate the present routine.

At the step S503, the controller 530 stores the present position as a danger position and thereafter the present routine terminated.

With the thus arranged fifth embodiment, it becomes possible to store a point at which the ABS controller operates, as a danger point. This enables the point where the quick braking was executed for avoiding a danger condition to bee stored in the navigation system and enables the driver to recall the danger point.

Sixth Embodiment

Figure 16:
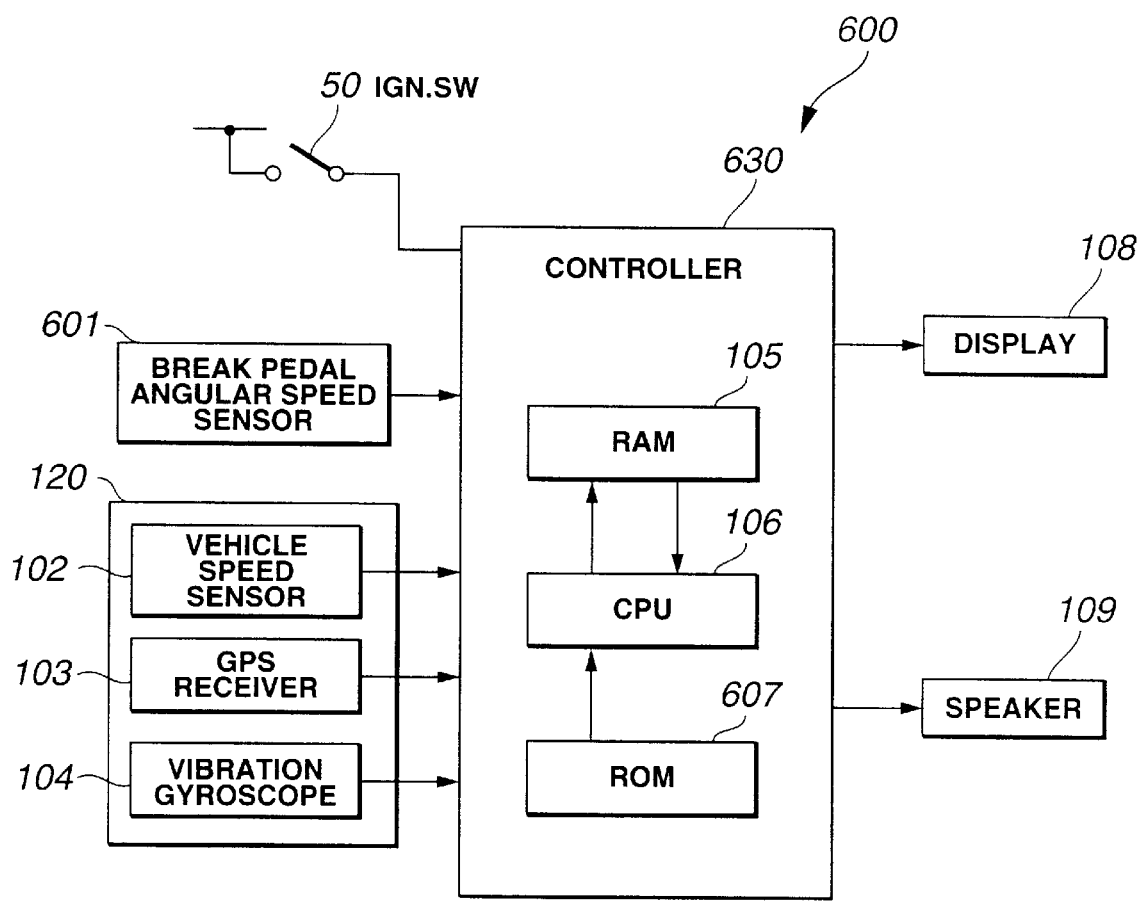
FIG. 16 is a schematic view showing the basic construction of the navigation system of a sixth embodiment according to the present invention.
Figure 17:
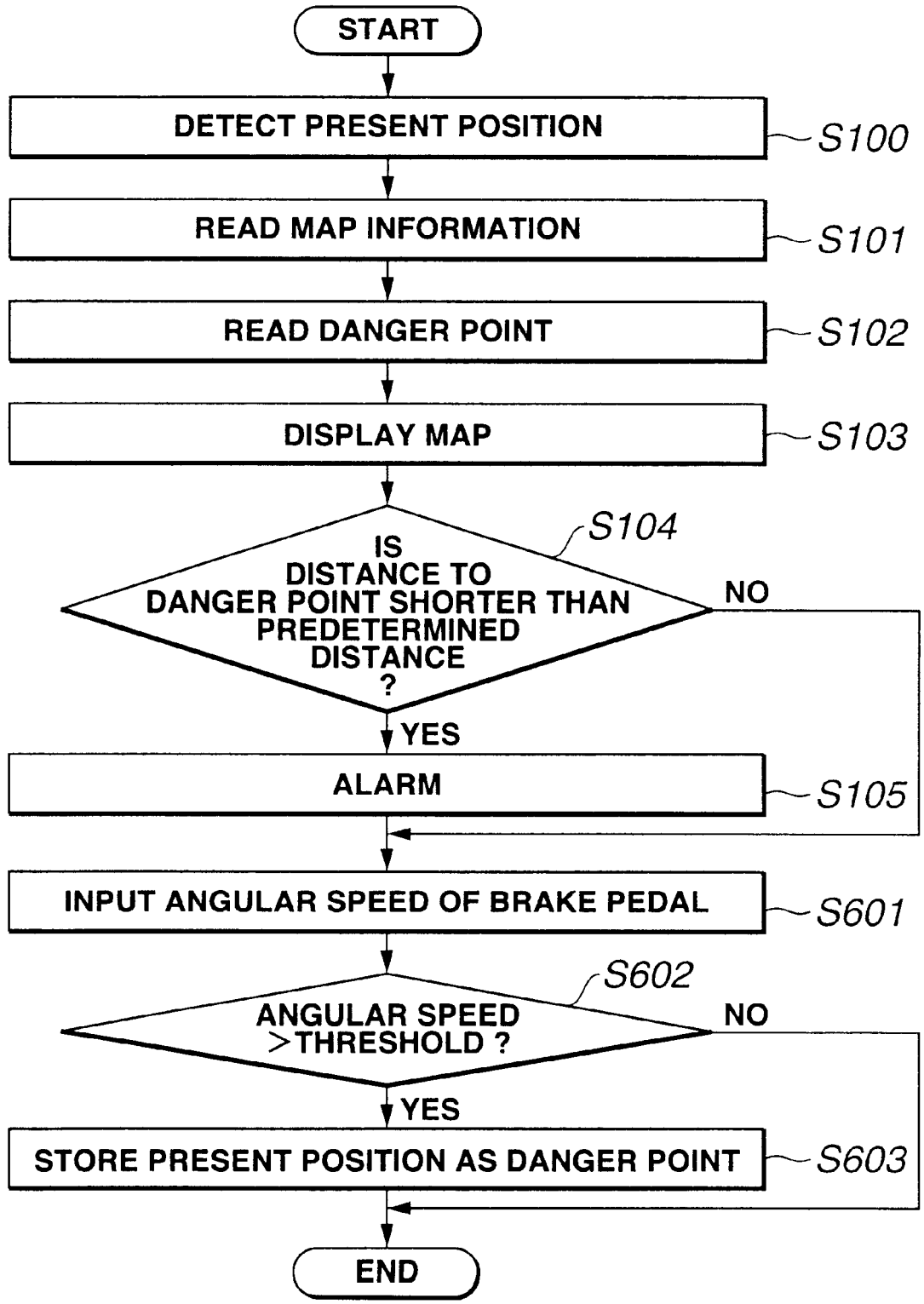
FIG. 17 is a flowchart showing a control operation of the navigation system of the sixth embodiment according to the present invention.

Referring to FIGS. 16 and 17, there is shown a sixth embodiment of the navigation system including the information system according to the present invention. The basic construction of the sixth embodiment is generally the same as that of the first embodiment shown in FIG. 1, and the same elements are denoted by the same reference numerals of the first embodiment. Therefore, the explanation of the basic construction is omitted herein. The sixth embodiment is characteristically arranged to comprise a brake pedal angular speed sensor 601 for detecting an angular speed of the brake pedal, and to decide that a point, at which the angular speed of the brake pedal becomes greater than a threshold (an angular speed threshold for deciding a danger point), is a danger point, and to store the point as a danger point. The brake pedal angular speed sensor 601 is installed to the brake pedal and outputs a signal indicative of the angular speed of the brake pedal to the controller 630.

With reference to a flowchart of FIG. 17, the manner of control operation of the navigation system according to the sixth embodiment will be discussed. The flowchart of FIG. 17 includes the basic steps as same as those of the flowchart of FIG. 4. These basic steps are denoted by the same reference numerals and the explanation thereof is omitted herein. It is of course that the flowchart of FIG. 17 is stored in a ROM 607 in the form of a control program. The braking operation executed by a driver is represented by the angular speed of the brake pedal and is detected by the brake pedal angular speed sensor 601. The detected angular speed is sent to the controller 630.

At a step S601 after the execution of the basic steps S100 to S105, the controller 630 receives the angular speed data of the brake pedal from the brake pedal angular speed sensor 601.

At a step S602, the controller 630 decides whether or not the detected angular speed is greater than the threshold stored in the ROM 607. When the decision at the step is affirmative, that is, when the controller 630 decides that the present position is a danger point, the routine proceeds to a step S603. When the decision at the step S602 is negative, the routine jumps to an end block to terminate the present routine.

At the step S603, the controller 630 stores the present position as a danger point in the RAM 105, and thereafter the routine proceeds to the end block to terminate the present routine.

With the thus arranged sixth embodiment, it becomes possible to decide a point where the brake pedal angular speed indicative of the operation variation of the brake pedal is greater than the threshold and to store the point as a danger point. This enables the point where the quick braking was executed for avoiding a danger condition to be stored in the navigation system and enables the driver to recall the danger point through the danger point information.

Seventh Embodiment

Figure 18:
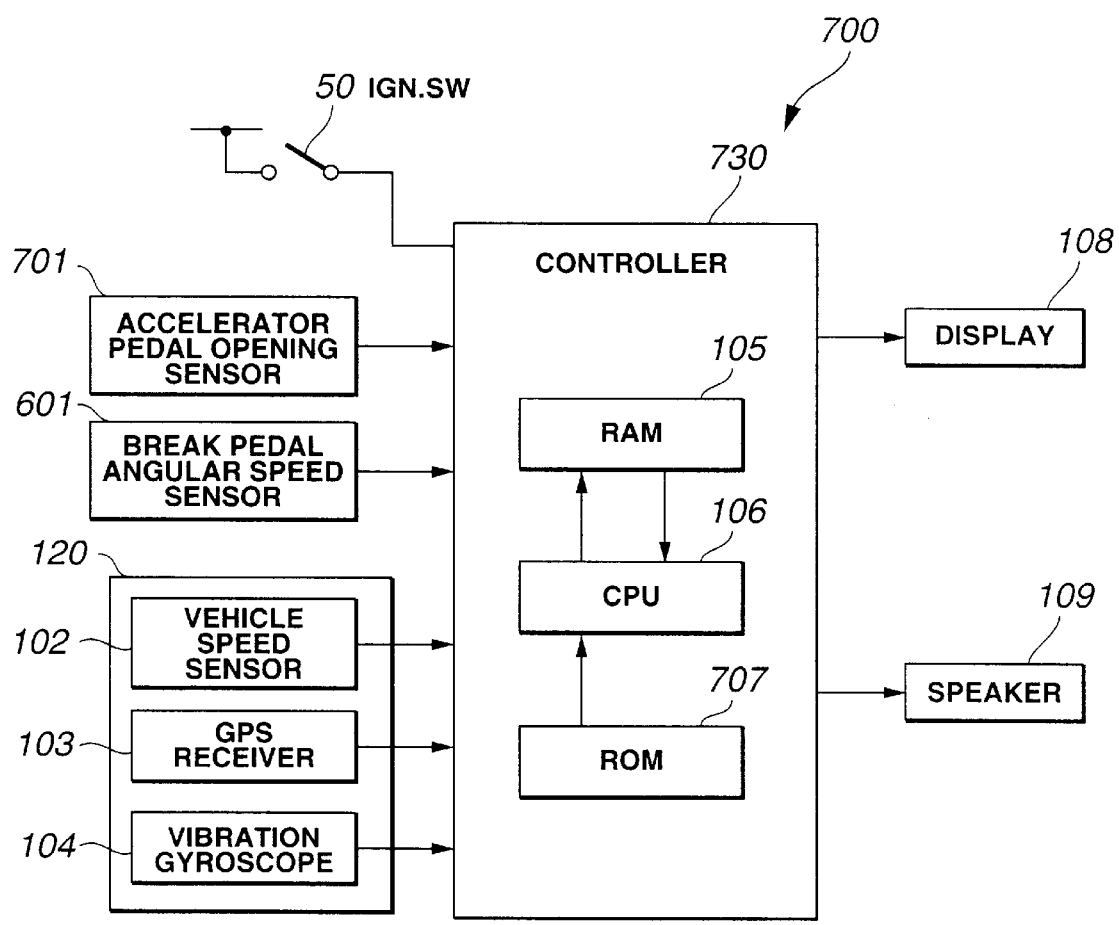
FIG. 18 is a schematic view showing the basic construction of the navigation system of a seventh embodiment according to the present invention.
Figure 19:
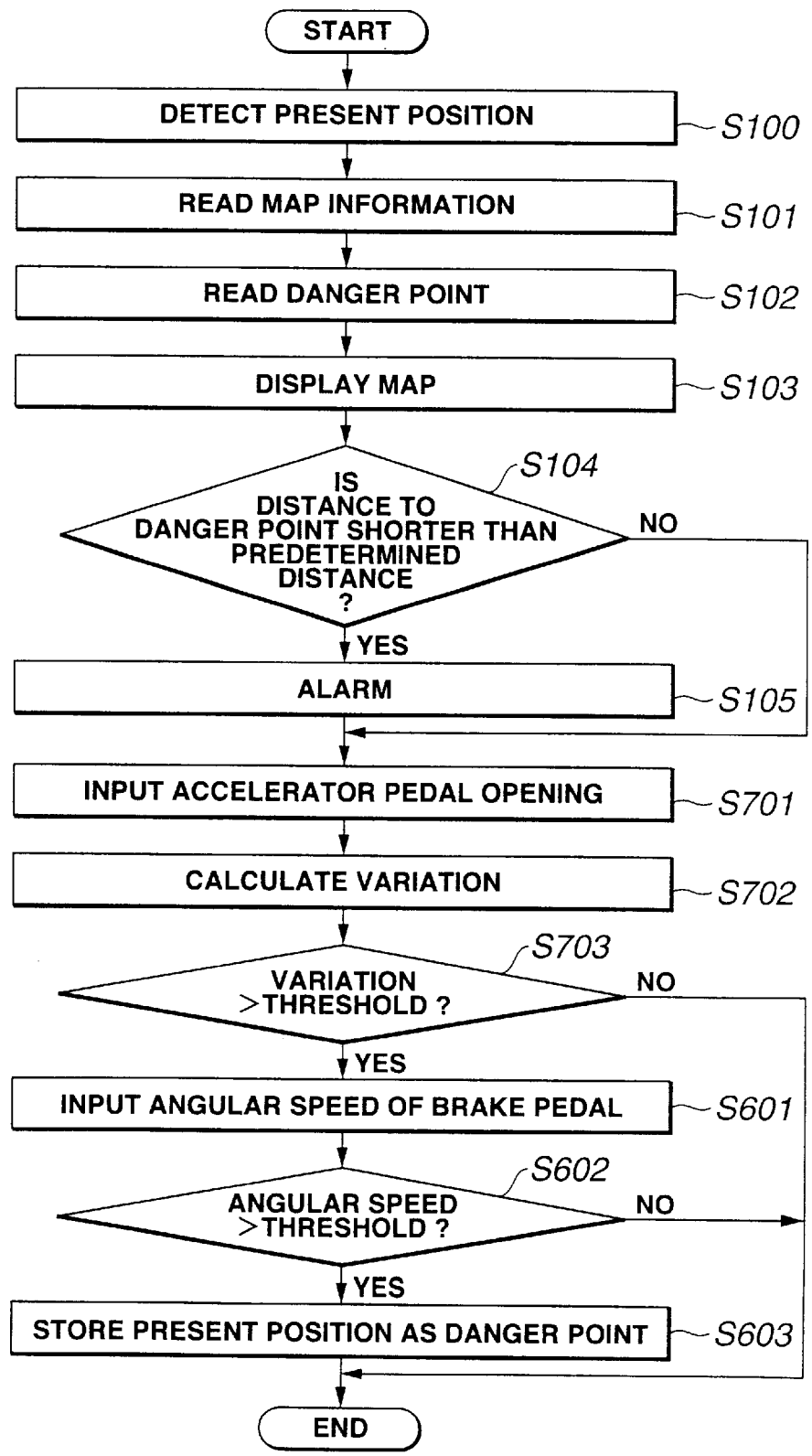
FIG. 19 is a flowchart showing a control operation of the navigation system of the seventh embodiment according to the present invention.

Referring to FIGS. 18 and 19, there is shown a seventh embodiment of the navigation system including the information system according to the present invention. The basic construction of the seventh embodiment is generally the same as that of the sixth embodiment shown in FIG. 16, and the same elements are denoted by the same reference numerals of the sixth embodiment. Therefore, the explanation of the basic construction is omitted herein. The seventh embodiment is characteristically arranged to comprise an accelerator pedal opening sensor 701 in addition to the brake pedal angular speed sensor 601 and to detect a point at which the variation of the opening of the accelerator pedal (not shown) becomes greater than a threshold as to a driver's accelerating operation and the angular speed of the brake pedal becomes greater than the threshold, and to store the point as a danger point. The accelerator pedal opening sensor 701 is an encoder installed to the accelerator pedal and outputs a signal indicative of the opening of the accelerator pedal to the controller 730.

With reference to a flowchart of FIG. 19, the manner of control operation of the navigation system according to the seventh embodiment will be discussed. The flowchart of FIG. 19 includes the basic steps as same as that of the flowchart of FIG. 17. These basic steps are denoted by the same reference numerals and the explanation thereof is omitted herein. It is of course that the flowchart of FIG. 19 is stored in a ROM 707 in the form of a control program. In the case that the driver quickly depresses the brake pedal, the driver first releases the accelerator pedal and quickly depresses the brake pedal. These operations are generally executed as a continuous unit operation.

At a step S701 after the execution of the basic steps S100 to S105, the controller 730 receives the opening of the accelerator pedal from the accelerator pedal opening sensor 701.

At a step S702, the controller 730 temporally stores the present detected opening in the RAM 105 and calculates a variation between the previous opening and the present opening of the accelerator pedal.

At a step S703, the controller 730 decides whether or not the calculated opening variation is greater than the threshold stored in the ROM 707. When the decision at the step S703 is affirmative, that is, the routine proceeds to the step S601. When the decision at the step S703 is negative, the routine jumps to an end block to terminate the present routine.

From the step S601 following to the affirmative decision at the step S703, the controller 730 executes the decision as to the depression of the brake pedal. Therefore, only when both decisions of the steps S703 and S602 are affirmative, the controller 730 decides that the vehicle is encountering a danger condition, and stores the present position as a danger point in the RAM 105.

With the thus arranged seventh embodiment, it becomes possible to detect a point where the operation variation of the accelerator pedal becomes greater than the threshold and the brake pedal is then quickly depressed, and to store the point as a danger point. This enables the point where the quick release of the accelerator pedal and the quick braking were executed for avoiding a danger condition to be stored in the navigation system and enables the driver to recall the danger point.

Eighth Embodiment

Figure 20:
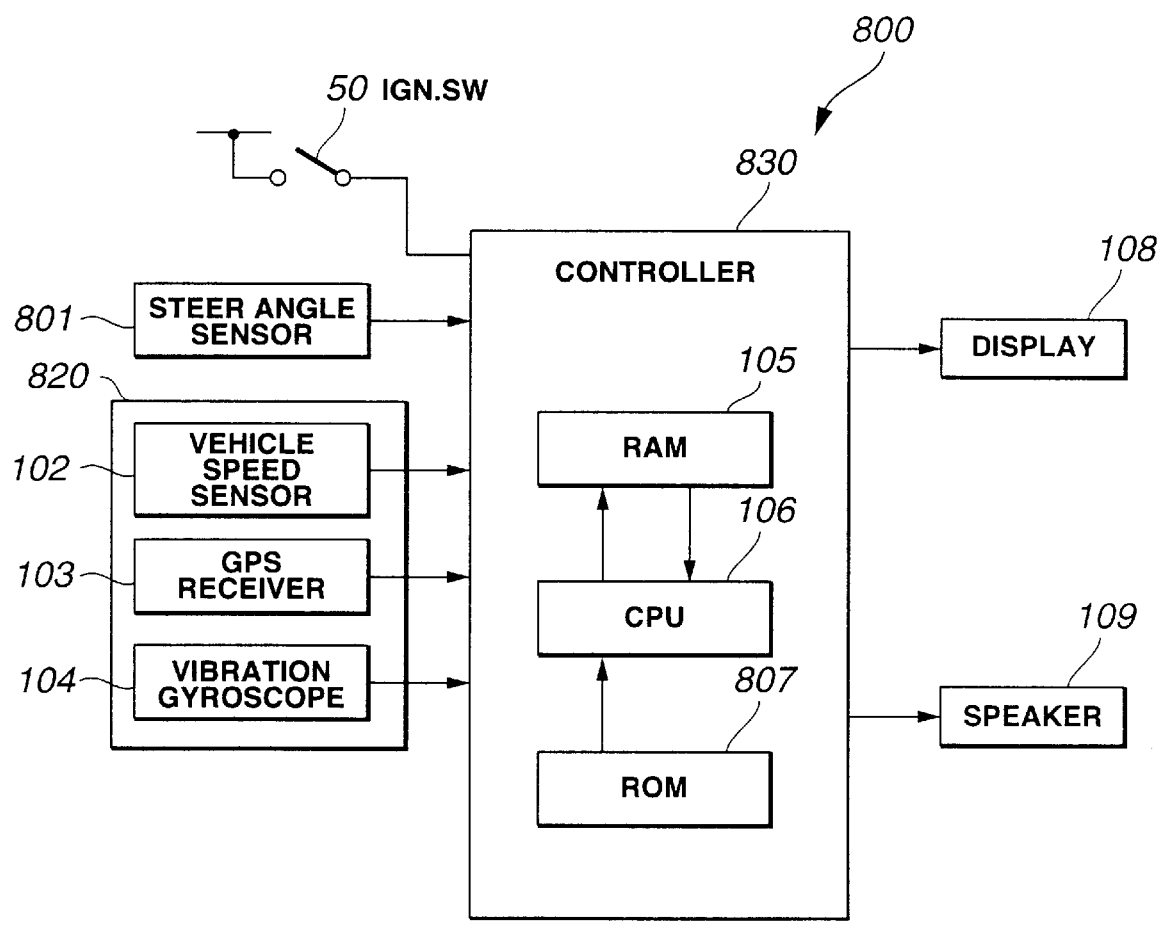
FIG. 20 is a schematic view showing the basic construction of the navigation system of an eighth embodiment according to the present invention.
Figure 21:
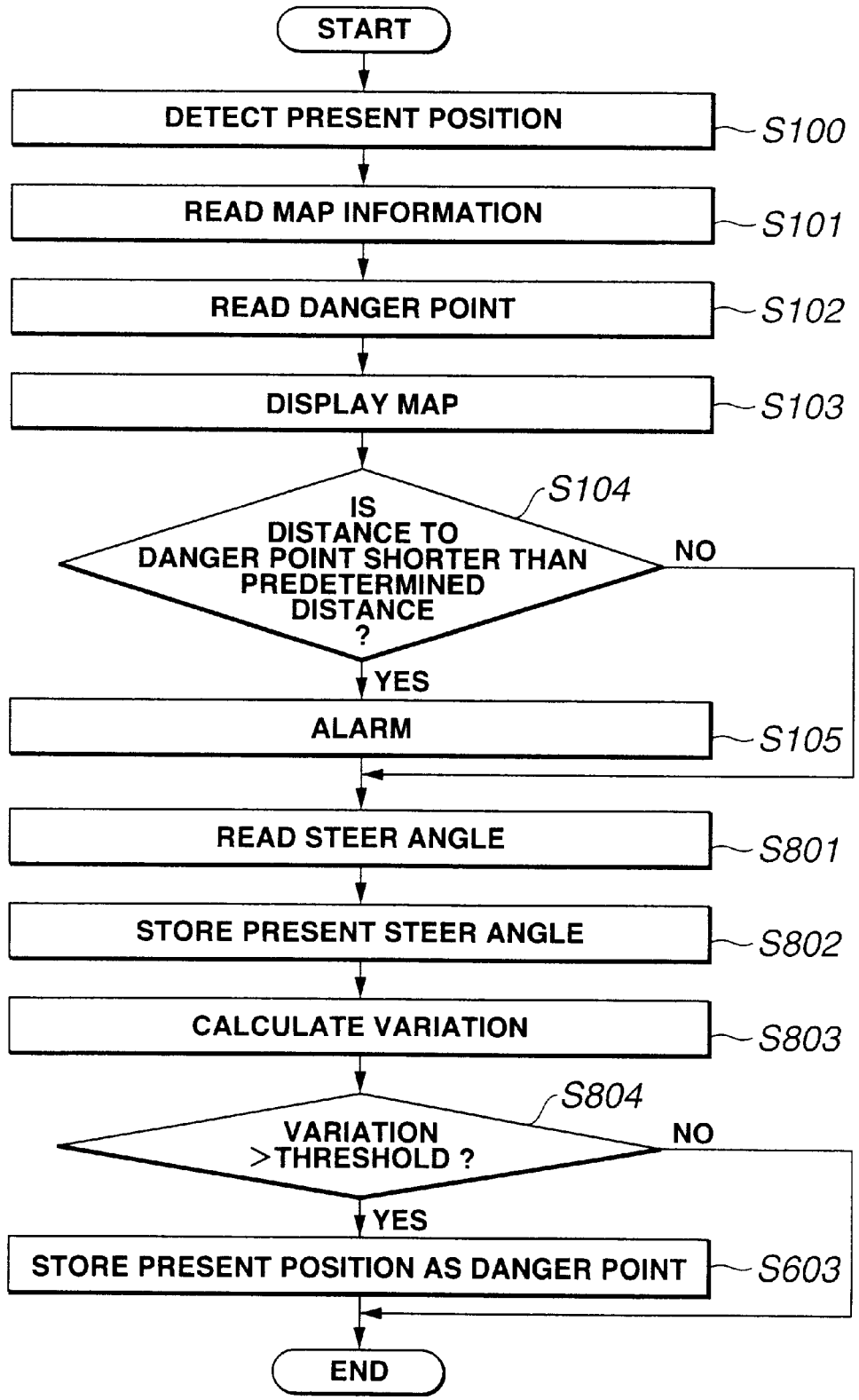
FIG. 21 is a flowchart showing a control operation of the navigation system of the eighth embodiment according to the present invention.

Referring to FIGS. 20 and 21, there is shown an eighth embodiment of the navigation system including the information system according to the present invention. The basic construction of the eighth embodiment is generally the same as that of the sixth embodiment shown in FIG. 16, and the same elements are denoted by the same reference numerals of the sixth embodiment. Therefore, the explanation of the basic construction is omitted herein. The eighth embodiment is characteristically arranged to comprise a steer angle sensor 801, and to detect a point at which the variation of the steer angle becomes greater than a threshold, and to store the point as a danger point. The steer angle sensor 801 is an encoder installed to a steering and outputs a signal indicative of the steer angle generated by the steering operation of the driver to a controller 830.

With reference to a flowchart of FIG. 21, the manner of control operation of the navigation system according to the sixth embodiment will be discussed. The flowchart of FIG. 21 includes the basic steps as same as that of the flowchart of FIG. 17. These basic steps are denoted by the same reference numerals and the explanation thereof is omitted herein. It is of course that the flowchart of FIG. 21 is stored in a ROM 807 in the form of a control program. In the case that the driver quickly steers the steering, it is supposed that the driver executed this quick steer in order to avoid an obstacle ahead of the vehicle.

At a step S801 after the execution of the basic steps S100 to S105, the controller 830 receives the steer angle from the steer angle sensor 801.

At a step S802, the controller 830 temporally stores the present steer angle in the RAM 105.

At a step S803, the controller 830 calculates a variation between the previous steer angle and the present steer angle stored in the ROM 807.

At a step S804, the controller 830 decides whether or not the calculated steer angle variation is greater than the threshold stored in the ROM 807. When the decision at the step S804 is affirmative, that is, when the controller 830 decides that the vehicle is encountering a danger condition, the routine proceeds to the step S603. When the decision at the step S804 is negative, the routine jumps to an end block to terminate the present routine.

At the step S603 following to the affirmative decision of the step S804, the controller 830 stores the present position as a danger point in the RAM 105.

With the thus arranged eighth embodiment, the controller 830 is arranged to detect a point where the variation of the steer angle becomes greater than the threshold and to store the point as a danger point. This enables the driver to recall the danger point where the driver has executed the quick steer operation.

Ninth Embodiment

Figure 22:
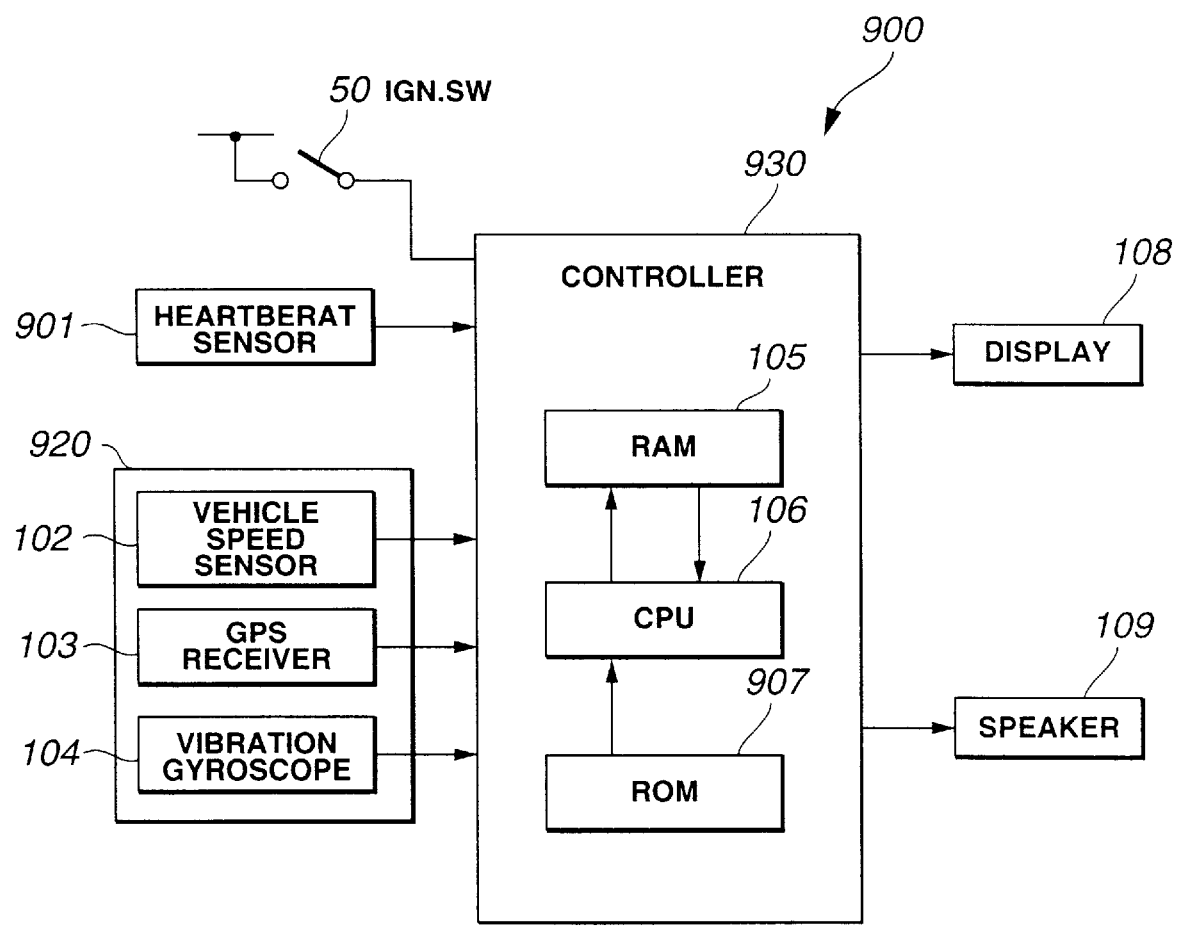
FIG. 22 is a schematic view showing the basic construction of the navigation system of a ninth embodiment according to the present invention.
Figure 23:
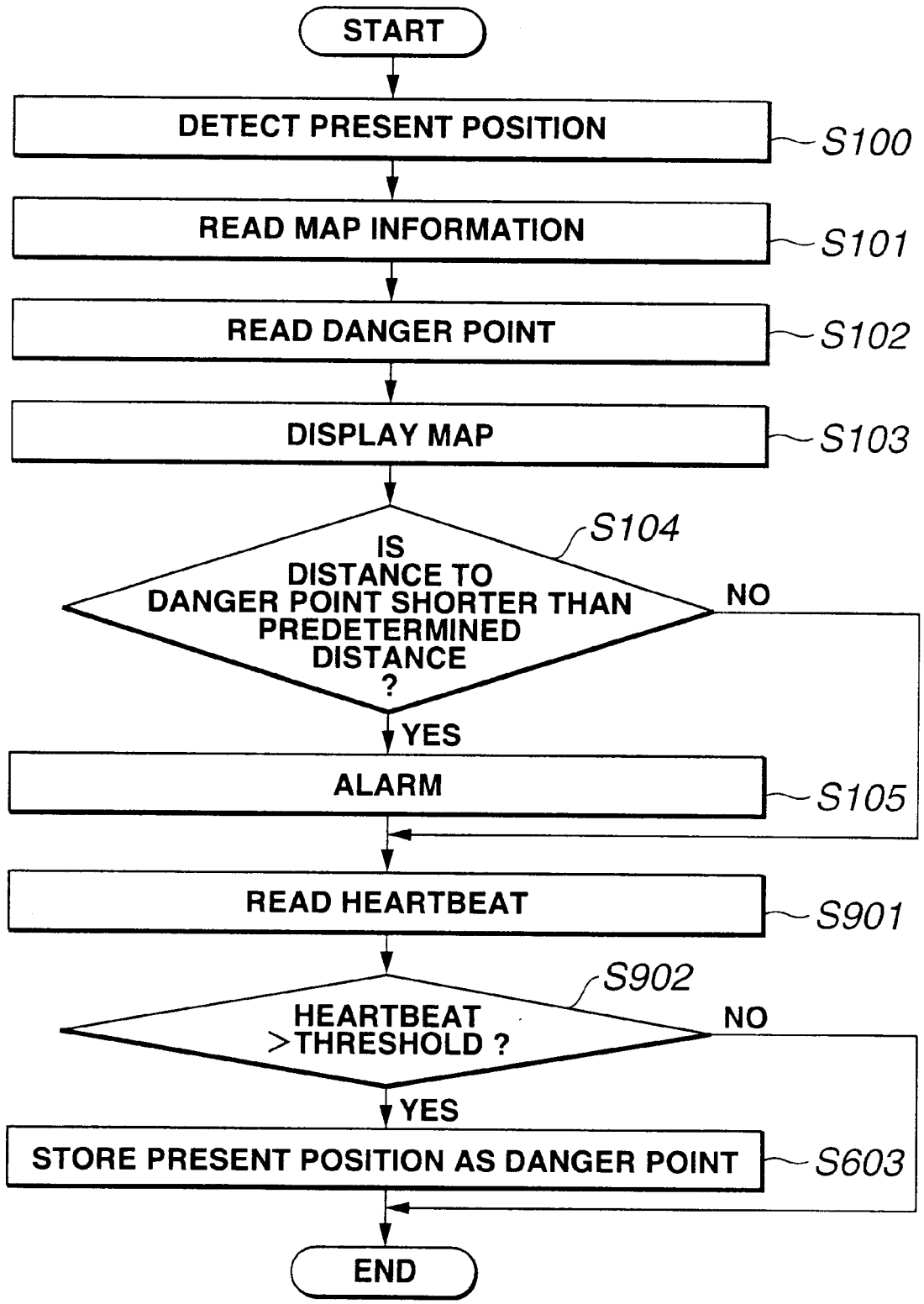
FIG. 23 is a flowchart showing a control operation of the navigation system of the ninth embodiment according to the present invention.
Figure 24:
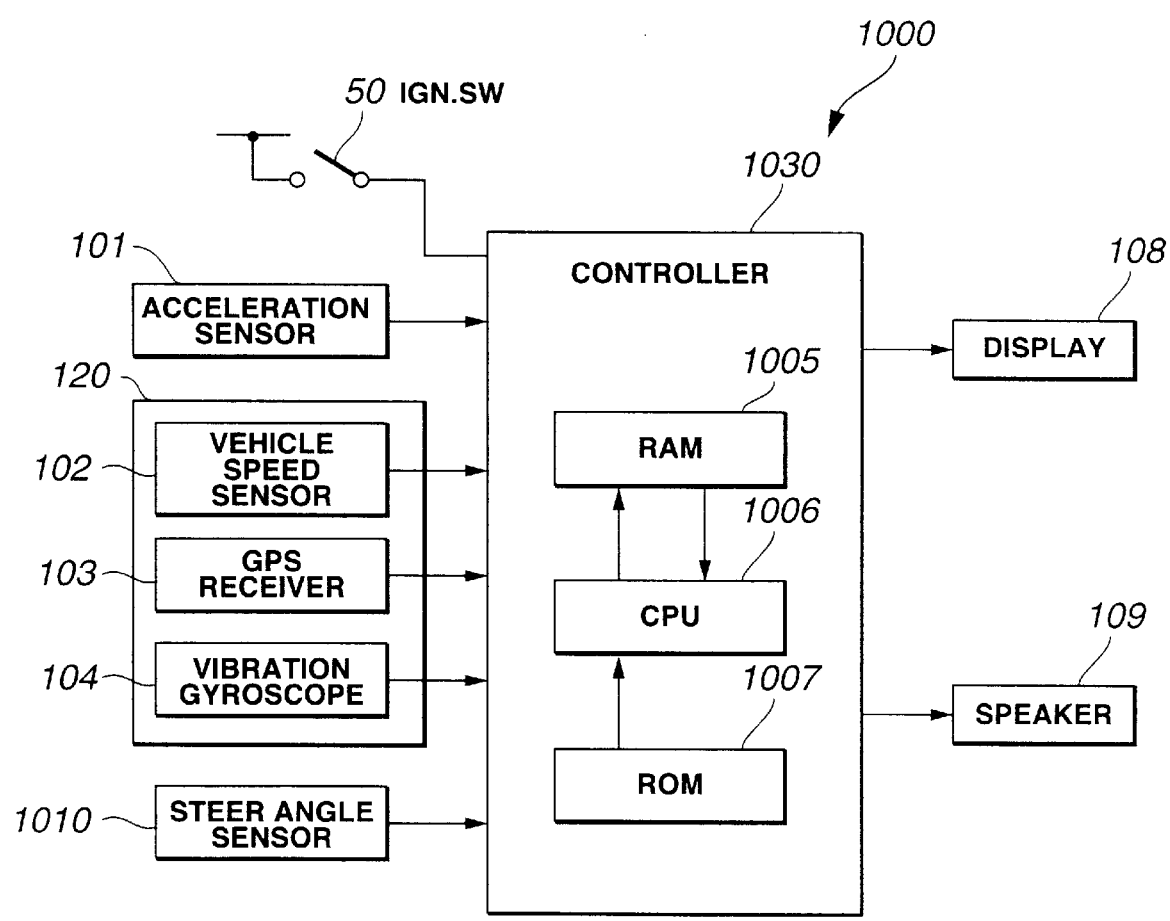
FIG. 24 is a schematic view showing the basic construction of the navigation system of a tenth embodiment according to the present invention.

Referring to FIGS. 22 and 23, there is shown a ninth embodiment of the navigation system including the information system according to the present invention. The basic construction of the ninth embodiment is generally the same as that of the sixth embodiment shown in FIG. 16, and the same elements are denoted by the same reference numerals of the sixth embodiment. Therefore, the explanation of the basic construction is omitted herein. The ninth embodiment is characteristically arranged to comprise a heartbeat sensor 901, and to detect a point at which a heartbeat of the driver becomes greater than a threshold, and to store the point as danger point. The heartbeat sensor 901 is attached at a temple or neck of the driver to detect the heartbeat of the driver and outputs a signal indicative of the heartbeat of the driver to the controller 930. Therefore, the controller 930 can detect various abnormal conditions including quick change of the vehicle behavior, quick driving operation by the driver, the abnormality of driving circumstance from the heartbeat of the driver. Although this embodiment has been shown and described to employ the heartbeat detected the heartbeat sensor 901, it will be understood that a diffusion value of r-r wave of the heartbeat or a heartbeat disturbance value represented by a difference between the present value of r-r wave and AR prediction value may be employed instead of the heartbeat.

With reference to a flowchart of FIG. 23, the manner of control operation of the navigation system according to the ninth embodiment will be discussed. The flowchart of FIG. 23 includes the basic steps as same as those of the flowchart of FIG. 17. These basic steps are denoted by the same reference numerals and the explanation thereof is omitted herein. It is of course that the flowchart of FIG. 23 is stored in a ROM 907 in the form of a control program. As to a case that the driver is surprised to recognize an obstacle put on a point ahead of the vehicle, the explanation of the flowchart of FIG. 23 will be done.

At a step S901 after the execution of the basic steps S100 to S105, the controller 930 receives the signal indicative of the heartbeat of the driver from the heartbeat sensor 901.

At a step S902, the controller 930 decides whether or not the detected heartbeat is greater than the threshold stored in a ROM 907. When the decision at the step S902 is affirmative, that is, when the vehicle is encountering a danger condition, the routine proceeds to a step S903. When the decision at the step S902 is negative, that is, when the controller 930 decides that the vehicle is not encountering the danger condition, the routine jumps to an end block to terminate the present routine.

At the step S903, the controller 930 stores the present position as a danger position in the RAM 105, and terminates the present routine.

With the thus arranged ninth embodiment, the controller 830 is arranged to detect a point where the heartbeat of the driver becomes greater than the threshold and to store the point as a danger point. This enables the driver to recall the danger point where the driver is surprised to an obstacle located on a road ahead of the vehicle. Further, the controller 930 is arranged to detect the magnitude of the variation of the heartbeat or of the dispersion of r-r wave or of disturbance of the heartbeat. This arrangement enables a magnitude of abnormal condition to be quantitatively stored in the RAM 106.

Tenth Embodiment

Referring to FIGS. 24 to 29, there is shown a tenth embodiment of the navigation system including the information system according to the present invention. The basic construction of the tenth embodiment is generally the same as that of the eighth embodiment shown in FIG. 20, and the same elements are denoted by the same reference numerals of the eighth embodiment. Therefore, the explanation of the basic construction is omitted herein. The tenth embodiment is characteristically arranged to comprise a steer angle sensor 1010 and to analyze a cause of the danger condition on the basis of a vehicle speed, a locus chart of the vehicle and a steer angle during when the vehicle encounters the danger condition. Further, the tenth embodiment is arranged to vary an alarm starting distance according to the danger condition and to store the positional information of the danger point and the alarm starting distance thereof. The steer angle sensor 1010 is an encoder and outputs a signal indicative of the steer angle of the steering rotated by the steering operation of the driver to the controller 1020.

FIGS. 25 and 26 show tables including typical seven cases of the danger patterns. These tables include a road view, a vehicle speed fluctuation corresponding to the danger condition, a locus chart, a steer angle fluctuation, and an impression of the driver to the danger condition.

The vehicle speed fluctuation is a pattern of temporal variation of the vehicle speed near the danger point. The locus chart of the vehicle is a pattern of a locus represented by the variation of the vehicle position. The steer angle fluctuation is a pattern represented by the temporal variation of the steer angle. The danger condition is recognition of the driver as to the traveling circumstance. The danger condition patterns are stored in a ROM 1007 in the form of data of reference patterns.

In general, when the traveling vehicle encounters a danger condition, it is possible to suppose various patterns. In order to classify the various patterns, it is assumed in this embodiment that a traffic backup is related to the vehicle speed fluctuation and is distinguished from the property of the vehicle speed fluctuation. A road shape such as straight or curve is related to the traveled locus chart and is distinguished from the property of the traveled locus chart. Further, the existence of an obstacle is related to the steer angle fluctuation and is distinguished from the property of the steer angle fluctuation.

FIG. 27 is a table showing alarm starting distance patterns where alarm starting distances corresponding to typical danger conditions are disclosed. More specifically, each pattern shown in this table includes a cause, a supposed factor, and an alarm starting distance which are related with each other. These patterns are stored in the ROM 1007 as reference patterns employed in an alarm information deciding process discussed later.

With reference to flowcharts shown in FIGS. 28 and 29, the manner of control operation of the navigation system according to the tenth embodiment will be discussed. This control program is started when the IGN-SW 50 is turned on and is repeated by 50 msec thereafter.

At a step S1000, the controller 1030 executes reading the present position and the traveling direction of the vehicle to the CPU 1006 on the basis of the present position indicative data and the traveling direction indicative data detected by the vehicle speed sensor 102, the GPS receiver 103 and the vibration gyroscope 104. The read data is stored in the RAM 1005, and therefore the stored data functions as data of a traveling locus chart of the traveling vehicle.

At a step S1001, the controller 1030 executes reading the road map data as to an area including the present position of the vehicle according to the scale set by the switch (not shown) of the navigation system from the ROM 1007 to the CPU 1006.

At a step S1002, the controller 1030 executes reading the data indicative of danger points and the data indicative of alarm starting distance from the RAM 1005 to the CPU 1006.

At a step S1003, the controller 1030 displays a mark indicative of the present position and the traveling direction, the road map including the present position and a mark indicative of the danger point in the display 108.

At a step S1004, the controller 1030 calculates a distance between the present position and the danger point and decides whether or not the distance to the danger point is shorter than the alarm starting distance. When the decision at the step S1004 is affirmative, the routine proceeds to a step S1005. When the decision at the step S1004 is negative, the routine jumps to a step S1006.

At the step S1005, the controller 1030 outputs alarm or alarm information through the speaker 109 to inform the driver that the vehicle is approaching the danger point.

At the step S1006, the controller 1030 executes reading the longitudinal acceleration (deceleration) of the vehicle from the acceleration sensor 101 to the CPU 1006.

At a step S1007, the controller 1030 executes reading the steer angle of the steering wheel from the steer angle sensor 1010 to the CPU 1006 and stores the data of the steer angle in the RAM 1005 for a predetermined time period. The controller 1030 utilizes this data for the predetermined time period as the data of the steer angle fluctuation of the vehicle.

At a step S1008, the controller 1030 executes reading the vehicle speed from the vehicle speed sensor 102 to the CPU 1006 and stores the data of the vehicle speed in the RAM 1005 for a predetermined time period. The controller 1030 utilizes this data for the predetermined time period as the data of the vehicle speed fluctuation of the vehicle.

At a step S1009, the controller 1030 compares the longitudinal acceleration read at the step S1006 with the acceleration threshold stored in the ROM 1005. More specifically, the controller decides whether or not the longitudinal acceleration of the vehicle is greater than the threshold. When the decision at the step S1009 is affirmative, that is, when the controller 1030 decides that the vehicle encounters a danger condition, the routine proceeds to a step S1010. When the decision at the step S1009 is negative, that is, when the controller 1030 decides that the vehicle does not encounter a danger condition, the routine jumps an end block to terminate the present routine.

Figure 29:
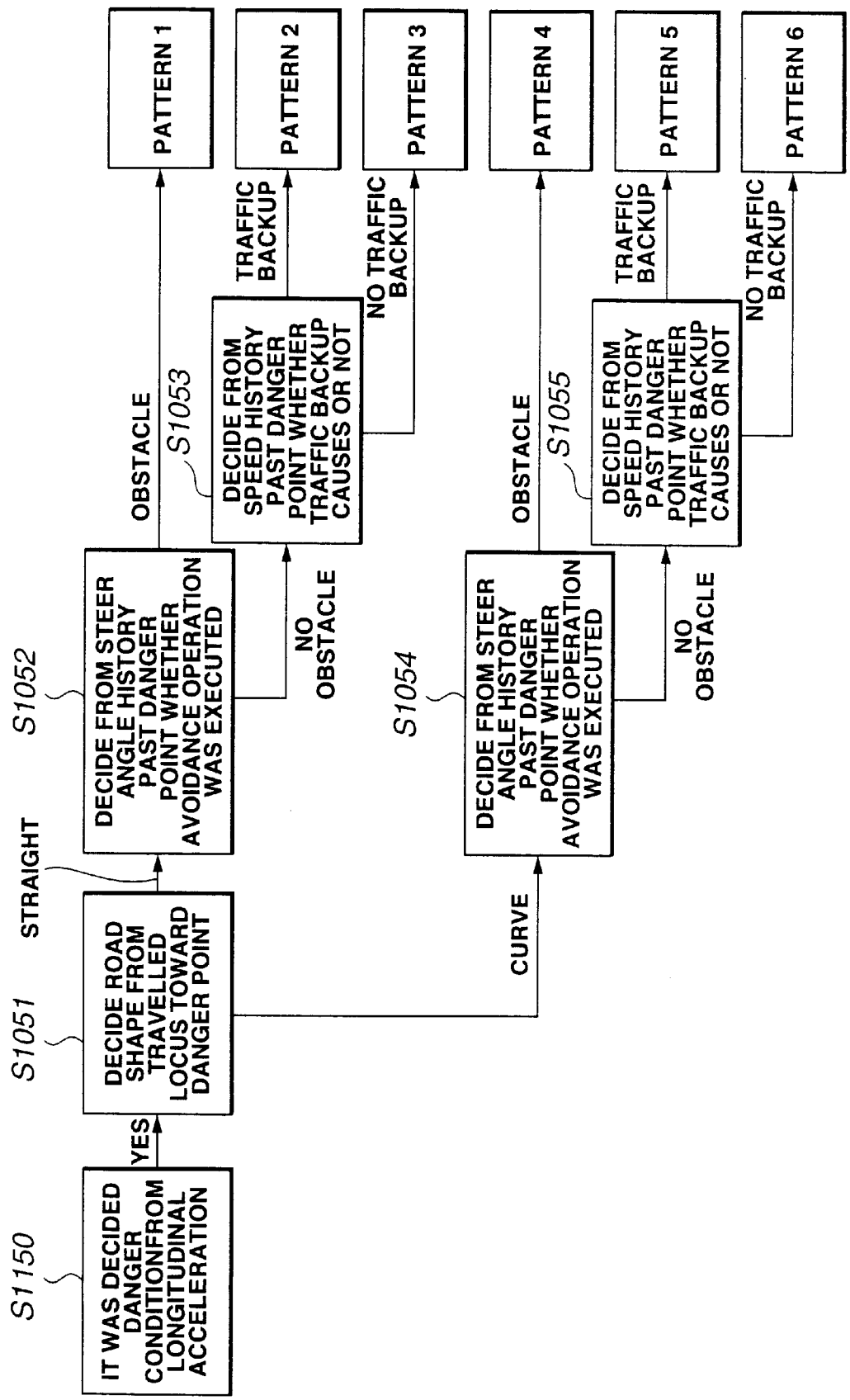
FIG. 29 is a flowchart showing an alarm information deciding process of the tenth embodiment.
Figure 30:
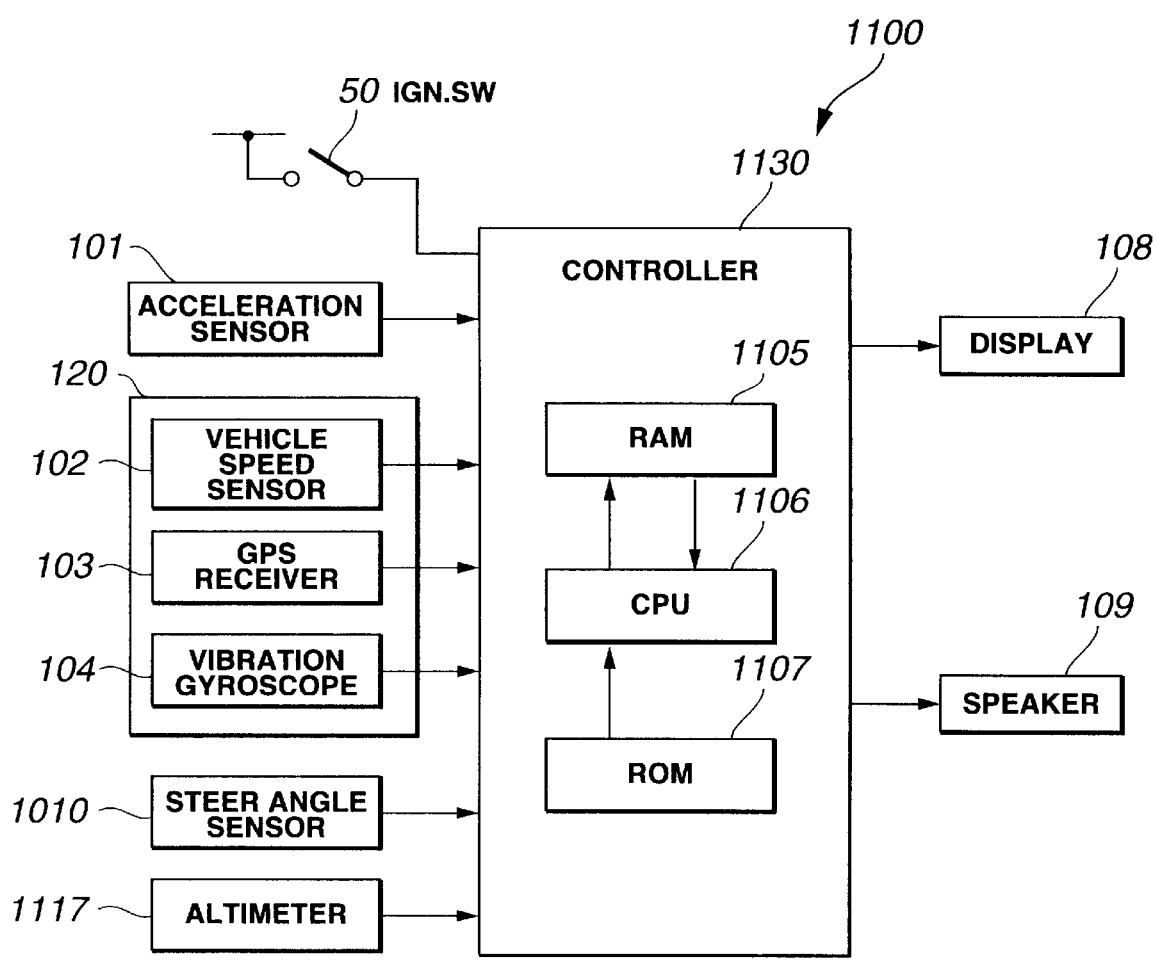
FIG. 30 is a schematic view showing the basic construction of the navigation system of an eleventh embodiment according to the present invention.

At the step S1010, the controller 1030 executes an alarm information decision process that is a subroutine shown in FIG. 29. After the execution of the alarm information process, the routine returns to a step S1011.

At the step S1011, the controller 1030 stores the present position of the vehicle in the RAM 1005 as a danger point and stores the alarm starting distance corresponding to the stored danger point in the RAM 1005. Thereafter, the present routine is terminated.

Next, with reference to the flowchart of FIG. 29, the subroutine as to the alarm information decision process of the step S1010 will be discussed.

When at the step S1010 the controller 1030 receives a subroutine command, the controller 1030 starts the subroutine program shown by the flowchart of FIG. 29.

Figure 28:
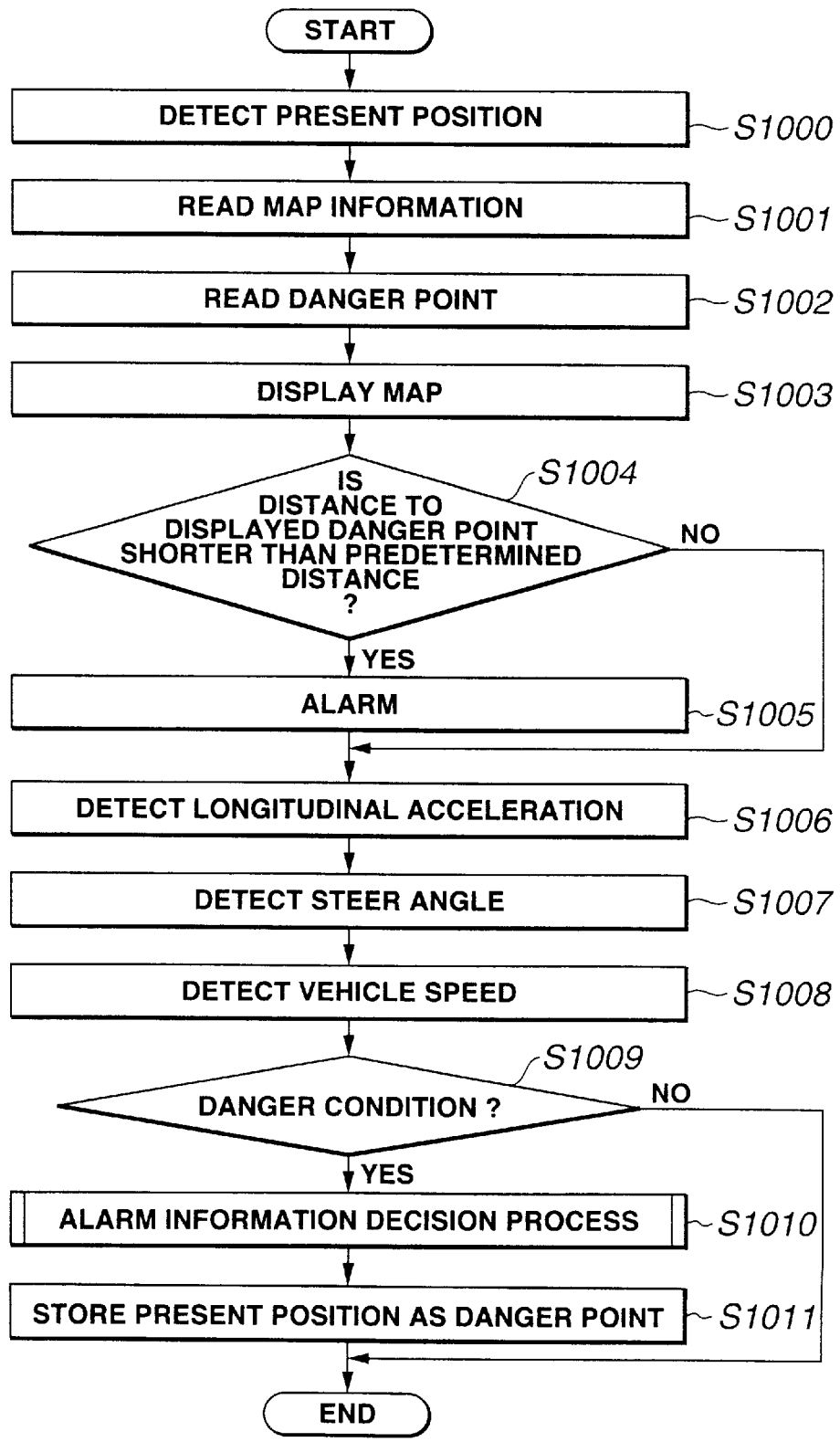
FIG. 28 is a flowchart showing a control operation of the navigation system of the third embodiment according to the present invention.

At a step S1150, the controller 1030 decides that the vehicle encounters the danger condition in reply to the decision of the step S1009 of the main-routine of FIG. 28.

At a step S1051, the controller 1030 decides whether the road shape of the traveled road is straight or curve on the basis of the traveled locus on this side of the danger point. That is, by reading out the traveled locus stored in the RAM 1005 in the form of time-series data as to the present position, the controller 1030 compares the traveled locus chart with the reference danger condition patterns stored in the ROM 1007 by means of the known pattern matching method. From the property of the most similar reference pattern, the road shape of the traveling road is decided since the property of the most similar reference pattern includes the road view and the traveled locus chart as described in the explanation of the tables of FIGS. 25 and 26. As a result, according to the decided road shape, the deciding process proceeds to different steps. When the controller 1030 decides at the step S1051 that the road shape of the traveling road is straight, the decision routine proceeds to a step S1052. When the controller 1030 decides at the step S1051 that the road shape of the traveling road is curve, the decision routine proceeds to a step S1054.

At the step S1052, the controller 1030 decides whether or not an avoidance operation against an obstacle was executed by operating the steering wheel on the basis of the time-series data of the steer angle. That is, by reading the steer angle stored in the RAM 1005 in the form of time-series data, the controller 1030 compares the steer angle fluctuation data with the steer angle fluctuation indicative properties of the reference danger condition patterns stored in the ROM 1007 by means of the known pattern matching method. From the property indicative of the steer angle fluctuation data of the most similar reference pattern, the controller 1030 decides whether or not the avoidance operation was executed to avoid an obstacle on the traveling road. When the controller 1030 decides at the step S1052 that an avoidance operation was executed to avoid an obstacle, the controller 1030 decides that the encountering danger condition is Pattern 1. Since it is supposed that the danger condition in Pattern 1 is caused by quickly braking the vehicle on a flat curved road and by avoiding an obstacle as shown in FIG. 27, the alarm starting distance is determined at 100 m short of the danger point. Then, the controller 1030 stores the danger point and the alarm starting distance in the RAM 1005. When the controller 1030 decides at the step S1052 that no avoidance operation was executed, the decision sub-routine proceeds to a step S1053.

At the step S1053, the controller 1030 decides whether traffic backup causes or not on the basis of the time-series data of the vehicle speed after the vehicle passed the danger point. That is, by reading the vehicle speed data stored in the RAM 1005 in the form of time-series data, the controller 1030 compares the vehicle speed fluctuation data with the vehicle speed fluctuation indicative properties of the reference danger condition patterns stored in the ROM 1007 by means of the known pattern matching method. From the property indicative of the vehicle speed fluctuation data of the most similar reference pattern, the controller 1030 decides whether or not a traffic backup is causing on the traveling road. If the controller 1030 decides at the step S1053 that a traffic backup is causing, the controller 1030 decides that the encountering danger condition is Pattern 2. Since it is supposed that the danger condition in Pattern 2 is caused from starting a traffic backup on the flat straight road as shown in FIG. 27, the alarm starting distance is determined at 100 m short of the danger point. Then, the controller 1030 stores the danger point and the alarm starting distance in the RAM 1005.

When the controller 1030 decides at the step S1053 that no traffic backup is causing, the controller 1030 decides that the encountering danger condition is Pattern 3. Since it is supposed that the danger condition of Pattern 3 is caused by executing quick braking on a flat straight road and by starting the vehicle without any problem as shown in FIG. 27, the alarm starting distance is determined at 100 m short of the danger point. Then, the controller 1030 stores the danger point and the alarm starting distance in the RAM 1005.

On the other hand, at the step S1054 following to the curved road decision at the step S1051, the controller 1030 decides whether or not an avoidance operation against an obstacle was executed by operating the steering wheel on the basis of the time-series data of the steer angle as is similar to the step S1052.

When the controller 1030 decides at the step S1054 that an avoidance operation was executed to avoid an obstacle, the controller 1030 decides that the encountering danger condition is Pattern 4. Since it is supposed that the danger condition of Pattern 4 is caused by quickly braking the vehicle on a flat curved road and by avoiding an obstacle as shown in FIG. 27, the alarm starting distance is determined at 300 m short of the danger point. Then, the controller 1030 stores the danger point and the alarm starting distance in the RAM 1005. When the controller 1030 decides at the step S1054 that no avoidance operation was executed, the decision sub-routine proceeds to a step S1055.

At the step S1055, the controller 1030 decides whether traffic backup causes or not on the basis of the time-series data of the vehicle speed after the vehicle passed the danger point as is similar to the step S1053.

When the controller 1030 decides at the step S1055 that a traffic backup is causing, the controller 1030 decides that the encountering danger condition is Pattern 5. Since it is supposed that the danger condition in Pattern 5 is caused from starting a traffic backup on the flat curved road as shown in FIG. 27, the alarm starting distance is determined at 200 m short of the danger point. Then, the controller 1030 stores the danger point and the alarm starting distance in the RAM 1005.

When the controller 1030 decides at the step S1055 that no traffic backup is causing, the controller 1030 decides that the encountering danger condition is Pattern 6. Since it is supposed that the danger condition of Pattern 6 is caused by executing quick braking on a flat curved road and by starting the vehicle without any problem as shown in FIG. 27, the alarm starting distance is determined at 200 m short of the danger point. Then, the controller 1030 stores the danger point and the alarm starting distance in the RAM 1005.

With the thus arranged tenth embodiment, the navigation system comprises the acceleration sensor 101 which detects the longitudinal acceleration of the vehicle and is arranged to analyze a cause of a danger condition on the basis of the vehicle speed, the traveled locus, the steer angle when the acceleration (deceleration) detected by the acceleration sensor 101 is greater than the predetermined threshold. Further, the navigation system is arranged to vary the alarm starting distance according to the danger condition and to store the detected position of the danger point and the alarm starting distance thereof in the RAM 1005. When the vehicle approaches an area including the stored position indicative of a danger point, the navigation system displays the danger point in the display 108 and alarms the driver. These arrangements of the tenth embodiment enables the navigation system to produce optimum information by each vehicle and to provide optimum information fitted with a driving ability of a driver of the vehicle. Consequently, the navigation system can output an alarm to the driver at a suitable timing.

Eleventh Embodiment

Referring to FIGS. 30 to 36, there is shown an eleventh embodiment of the navigation system including the information system according to the present invention. The basic construction of the eleventh embodiment is generally the same as that of the tenth embodiment shown in FIG. 24, and the same elements are denoted by the same reference numerals of the tenth embodiment. Therefore, the explanation of the basic construction is omitted herein.

The eleventh embodiment is characteristically arranged to further comprise an altimeter 1117 and to analyze a cause of the danger condition on the basis of a vehicle speed, a locus chart of the vehicle, a steer angle and a road slope ratio of the traveling road during when the vehicle encounters a danger condition. Further, the eleventh embodiment is arranged to vary an alarm starting distance according to the danger condition and to store the position information of the danger point and the alarm starting distance thereto. The altimeter 1110 is a ROM, which has previously stored altitude data corresponding to the map data, and outputs the altitude data to the controller 1130 according to a reading command from the controller 1130.

FIGS. 31 and 32 show tables including typical eight cases of the danger patterns. These tables include a road view, a vehicle speed fluctuation corresponding to the danger condition, a locus chart, a steer angle fluctuation, a slope ratio fluctuation and an impression of the driver to the danger condition. These tables are basically the same as those of FIGS. 25 and 26 except that the road slope fluctuation is added to each pattern and Pattern 8 is newly added. The road slope ratio fluctuation is a pattern of temporal variation of the road slope near the danger point. These slope ratio patterns of the danger condition patterns are stored in a ROM 1107 in the form of data of reference patterns.

FIG. 33 shows a table representing alarm starting distance patterns where alarm starting distances are disclosed. More specifically, each pattern shown in this table includes a cause, a supposed factor, and an alarm starting distance which are related with each other. Although Patterns 1 to 6 are omitted in this table, Patterns 1 to 6 employed in this eleventh embodiment are completely the same as those shown in FIG. 27. Patterns 1 to 18 have been stored in the ROM 1107 as reference patterns employed in an alarm information deciding process discussed later.

Figure 34:
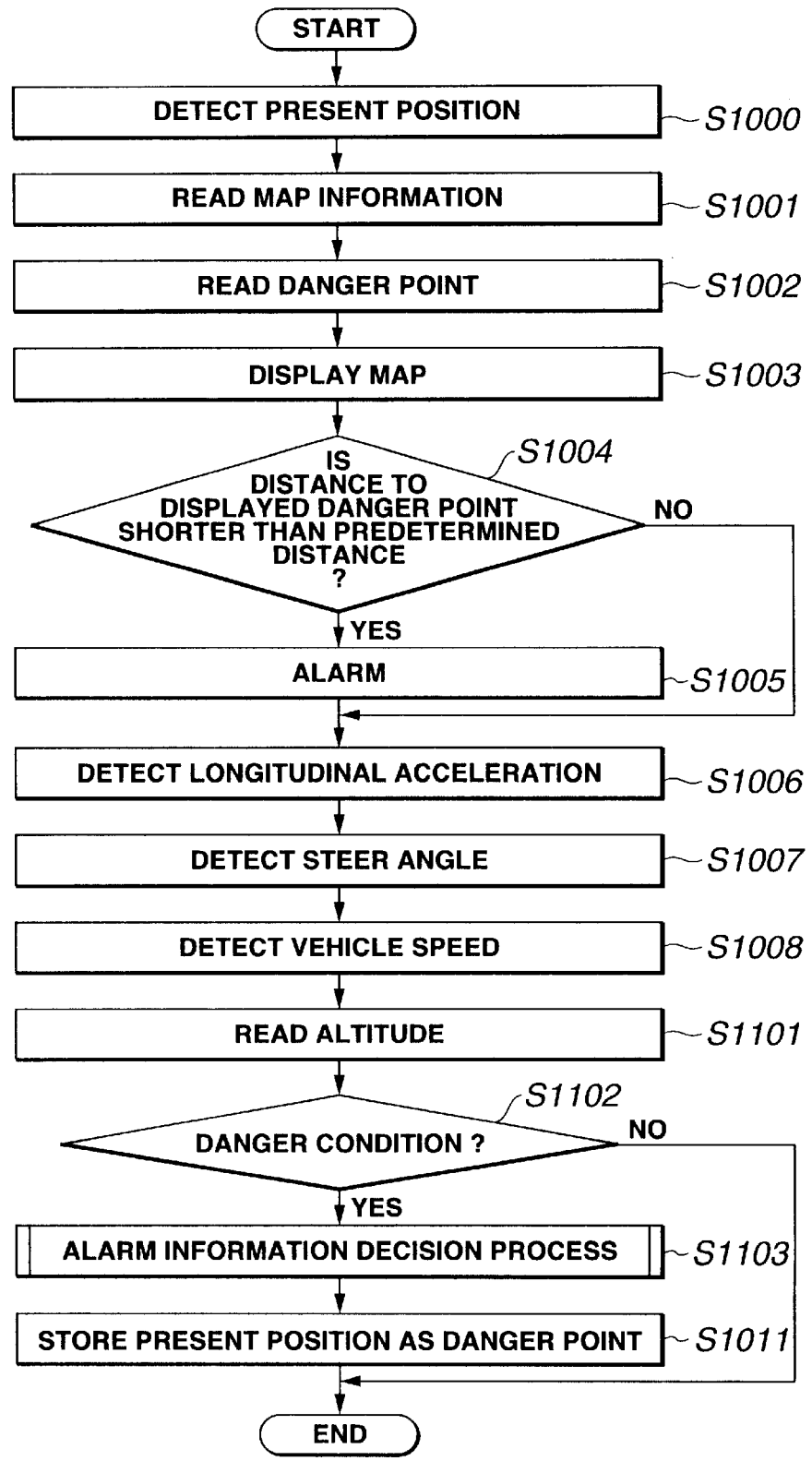
FIG. 34 is a flowchart showing a control operation of the navigation system of the eleventh embodiment according to the present invention.

With reference to flowchart of FIG. 34, the manner of control operation of the navigation system according to the eleventh embodiment will be discussed. The flowchart of FIG. 34 includes the basic steps as same as that of the flowchart of FIG. 28. These basic steps are denoted by the same reference numerals and the explanation thereof is omitted herein. It is of course that the flowchart of FIG. 34 is stored in a ROM 1107 in the form of a control program.

At a step S1101 after the execution of the steps S1000 to S1008, the controller 1130 executes reading the altitude data corresponding to the present position from the altimeter 1117 to the CPU 1105 and stores the data of the altitude in the RAM 1105 for a predetermined time period. The controller 1130 utilizes this time-series data as the data of the road slope ratio fluctuation of the vehicle.

At a step S1102, the controller 1130 compares the longitudinal acceleration read at the step S1006 with the threshold stored in the ROM 1107. More specifically, the controller decides whether or not the longitudinal acceleration of the vehicle is greater than the threshold. When the decision at the step S1102 is affirmative, that is, when the controller 1130 decides that the vehicle encounters the danger condition, the routine proceeds to a step S1103. When the decision at the step S1102 is negative, that is, when the controller 1130 decides that the vehicle does not encounter the danger condition, the routine jumps an end block to terminate the present routine.

Figure 35:
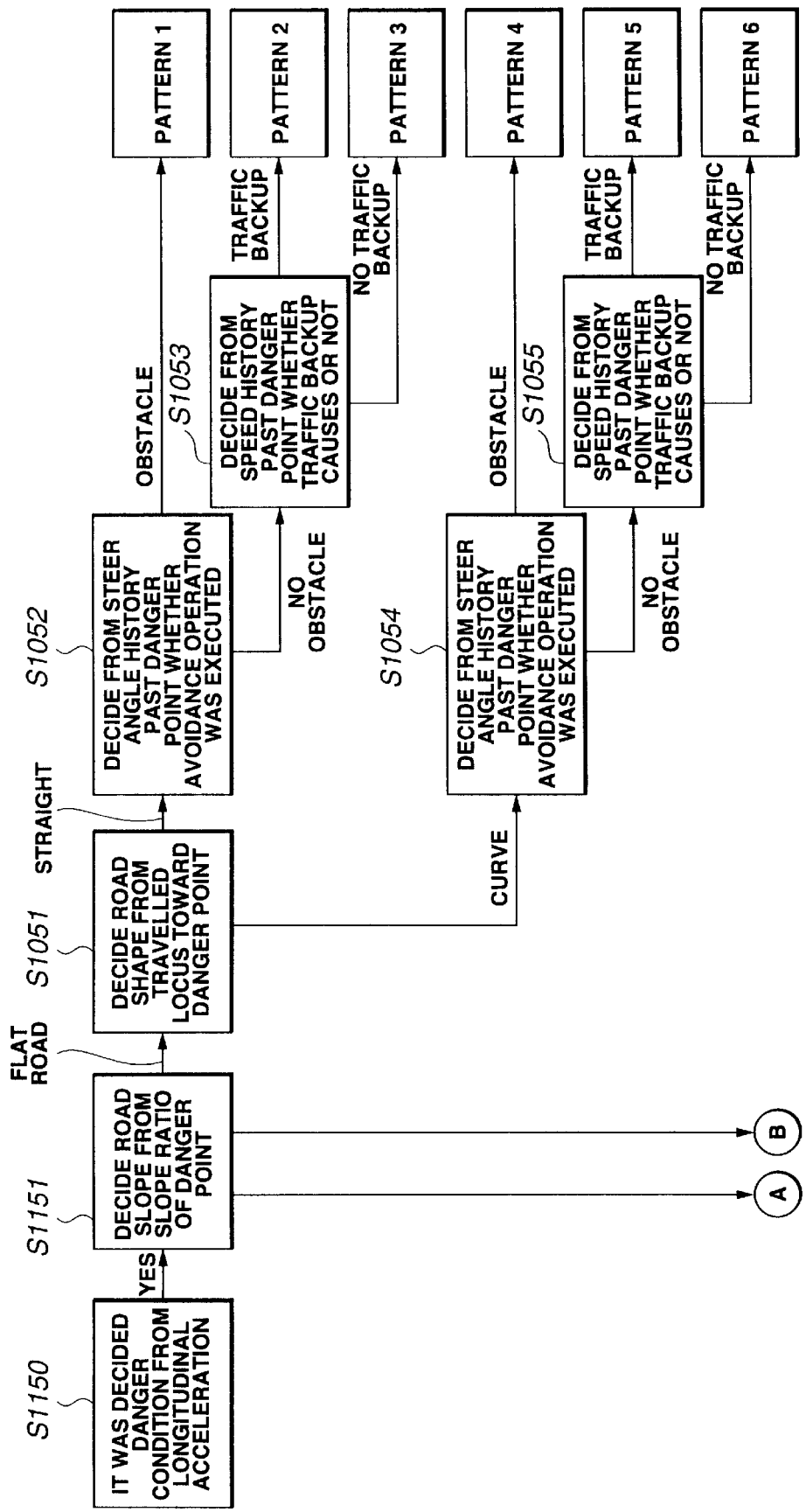
FIG. 35 is a flowchart showing a part of an alarm information deciding process of the eleventh embodiment.
Figure 36:
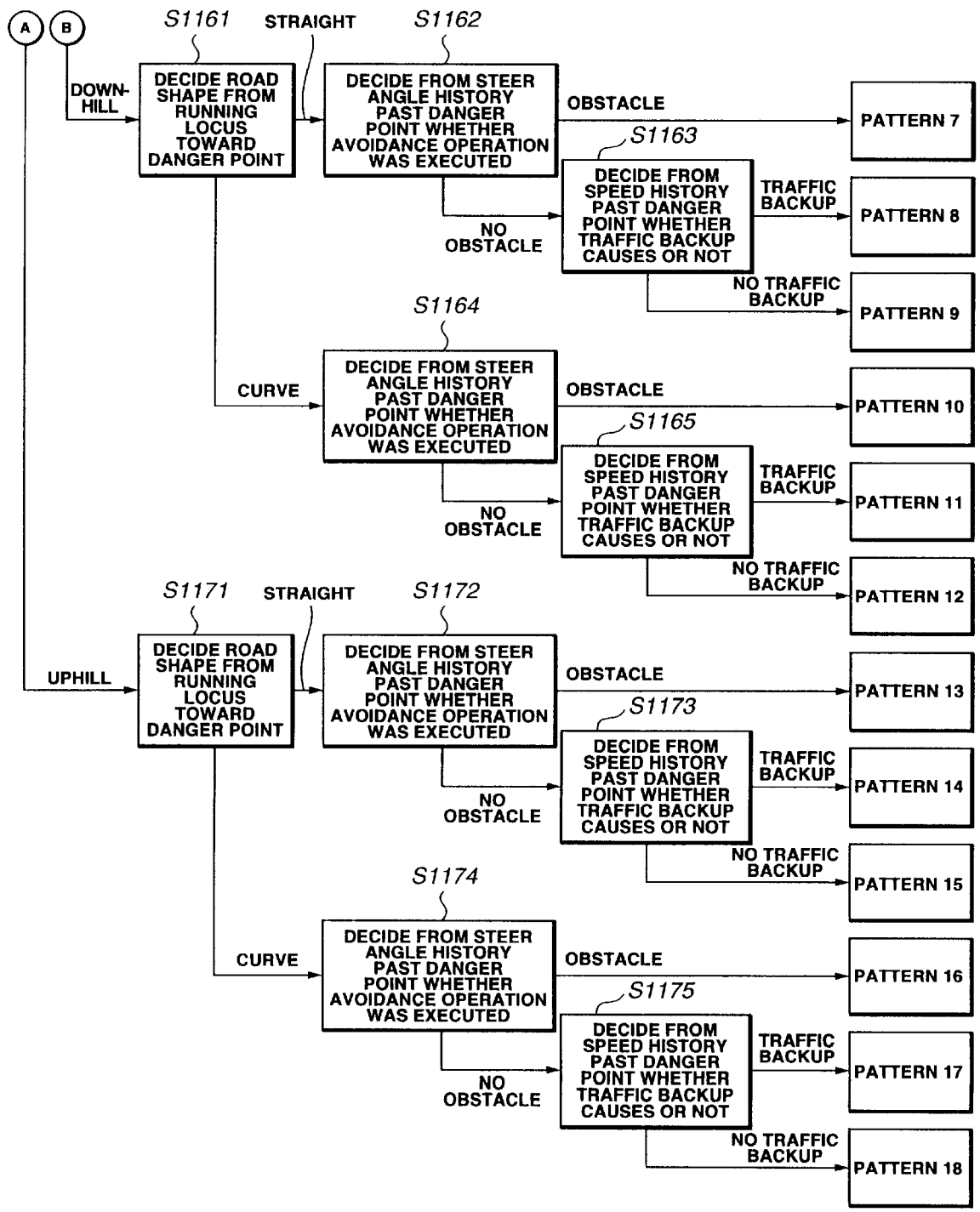
FIG. 36 is a flowchart showing the other part of an alarm information deciding process of the eleventh embodiment.

At the step S1103, the controller 1130 executes an alarm information decision process that is a subroutine shown in FIGS. 35 and 36. After the execution of the alarm information process, the routine returns to a step S1011.

At the step S1011, the controller 1130 stores the present position of the vehicle in the RAM 1105 as a danger point and stores the alarm starting distance corresponding to the stored danger point in the RAM 1105. Thereafter, the present routine is terminated.

Next, with reference to the flowchart of FIGS. 35 and 36, the subroutine as to the alarm information decision process of the step S1103 will be discussed. The flowchart of FIGS. 35 and 36 includes the basic steps as same as that of the flowchart of FIG. 29. These basic steps are denoted by the same reference numerals and the explanation thereof is omitted herein. It is of course that the flowchart of FIGS. 35 and 36 is stored in a ROM 1107 in the form of a control program.

When at the step S1103 the controller 1130 receives a subroutine command, the controller 1130 starts the subroutine program shown by the flowchart of FIGS. 35 and 36.

At a step S1150, the controller 1130 decides that the vehicle encounters the danger condition in reply to the decision of the step S1103 of the main-routine of FIG. 34.

At a step S1151, the controller 1130 decides the road slope of the traveling road from the road slope ratio near the danger point. That is, by reading the road slope ratio fluctuation stored in the ROM 1105 and checking the actual data with the plurality of road slope ratios of the respective danger condition patterns, the controller 1130 decides whether the traveling road is a flat road, an uphill or a downhill.

When the controller 1130 decides that the traveling road is a flat road, the routine proceeds to the step S1051 described in the tenth embodiment and selects one of Patterns 1 to 6 by executing the steps S1051 to S1055. When the controller 1130 decides that the traveling road is a downhill, the routine proceeds to the step S1161. When the controller 1130 decides that the traveling road is an uphill, the routine proceeds to the step S1171.

At the step S1161, the controller 1130 decides whether the road shape of the traveling road is straight or curve on the basis of the traveled locus toward the danger point, as is similar to the step S1051. When the controller 1030 decides at the step S1161 that the road shape of the traveling road is straight, the decision routine proceeds to a step S1162. When the controller 1030 decides at the step S1161 that the road shape of the traveling road is curve, the decision routine proceeds to a step S1164.

At the step S1162, the controller 1130 decides whether or not an avoidance operation against an obstacle was executed by operating the steering wheel on the basis of the time-series data of the steer angle. When the controller 1030 decides at the step S1162 that an avoidance operation was executed to avoid an obstacle, the controller 1130 decides that the encountering danger condition is Pattern 7. Since it is supposed that the danger condition in Pattern 7 is caused by quickly braking the vehicle on a straight downhill and by avoiding an obstacle as shown in FIG. 33, the alarm starting distance is determined at 150 m short of the danger point. Then, the controller 1130 stores the danger point and the alarm starting distance in the RAM 1105. When the controller 1130 decides at the step S1162 that no avoidance operation was executed, the decision sub-routine proceeds to a step S1163.

At the step S1163, the controller 1130 decides whether traffic backup causes or not on the basis of the time-series data of the vehicle speed after the vehicle passed the danger point. When the controller 1130 decides at the step S1163 that a traffic backup is causing, the controller 1130 decides that the encountering danger condition is Pattern 8. Since it is supposed that the danger condition in Pattern 8 is caused from starting a traffic backup on the straight downhill as shown in FIG. 33, the alarm starting distance is determined at 150 m short of the danger point. Then, the controller 1130 stores the danger point and the alarm starting distance in the RAM 1105.

When the controller 1130 decides at the step S1163 that no traffic backup is causing, the controller 1130 decides that the encountering danger condition is Pattern 9. Since it is supposed that the danger condition in Pattern 9 is caused by executing quick braking on a straight downhill and by starting the vehicle without a problem as shown in FIG. 33, the alarm starting distance is determined at 150 m short of the danger point. Then, the controller 1130 stores the danger point and the alarm starting distance in the RAM 1105.

On the other hand, at the step S1164 following to the curved road decision at the step S1161, the controller 1130 decides whether or not an avoidance operation against an obstacle was executed by operating the steering wheel on the basis of the time-series data of the steer angle as is similar to the step S1052.

When the controller 1030 decides at the step S1164 that an avoidance operation was executed to avoid an obstacle, the controller 1130 decides that the encountering danger condition is Pattern 10. Since it is supposed that the danger condition in Pattern 10 is caused by quickly braking the vehicle on a curved downhill and by avoiding an obstacle as shown in FIG. 33, the alarm starting distance is determined at 350 m short of the danger point. Then, the controller 1130 stores the danger point and the alarm starting distance in the RAM 1105. When the controller 1130 decides at the step S1164 that no avoidance operation was executed, the decision sub-routine proceeds to a step S1165.

At the step S1165, the controller 1130 decides whether a traffic backup causes or not on the basis of the time-series data of the vehicle speed after the vehicle passed the danger point as is similar to the step S1053. When the controller 1130 decides at the step S1165 that a traffic backup is causing, the controller 1130 decides that the encountering danger condition is Pattern 11. Since it is supposed that the danger condition in Pattern 11 is caused from starting a traffic backup on a curved downhill as shown in FIG. 33, the alarm starting distance is determined at 250 m short of the danger point. Then, the controller 1130 stores the danger point and the alarm starting distance in the RAM 1105.

When the controller 1130 decides at the step S1165 that no traffic backup is causing, the controller 1130 decides that the encountering danger condition is Pattern 12. Since it is supposed that the danger condition in Pattern 12 is caused by executing quick braking on a curved downhill and by starting the vehicle without any problem as shown in FIG. 33, the alarm starting distance is determined at 250 m short of the danger point. Then, the controller 1130 stores the danger point and the alarm starting distance in the RAM 1105.

On the other hand, at the step S1171 following to the uphill decision at the step S1151, the controller 1130 decides whether the road shape of the traveling road is straight or curve on the basis of the traveled locus toward the danger point, as is similar to the step S1051. When the controller 1130 decides at the step S1171 that the road shape of the traveling road is straight, the decision routine proceeds to a step S1172. When the controller 1130 decides at the step S1171 that the road shape of the traveling road is curve, the decision routine proceeds to a step S1174.

At the step S1122, the controller 1130 decides whether or not an avoidance operation against an obstacle was executed by operating the steering wheel on the basis of the time-series data of the steer angle. When the controller 1130 decides at the step S1172 that an avoidance operation was executed to avoid an obstacle, the controller 1130 decides that the encountering danger condition is Pattern 13. Since it is supposed that the danger condition in Pattern 13 is caused by quickly braking the vehicle on a straight uphill and by avoiding an obstacle as shown in FIG. 33, the alarm starting distance is determined at 100 m short of the danger point. Then, the controller 1130 stores the danger point and the alarm starting distance in the RAM 1105. When the controller 1130 decides at the step S1172 that no avoidance operation was executed, the decision sub-routine proceeds to a step S1173.

At the step S1173, the controller 1130 decides whether traffic backup causes or not on the basis of the time-series data of the vehicle speed after the vehicle passed the danger point. When the controller 1130 decides at the step S1173 that a traffic backup is causing, the controller 1130 decides that the encountering danger condition is Pattern 14. Since it is supposed that the danger condition in Pattern 14 is caused from starting a traffic backup on the straight uphill as shown in FIG. 33, the alarm starting distance is determined at 100 m short of the danger point. Then, the controller 1130 stores the danger point and the alarm starting distance in the RAM 1105.

When the controller 1130 decides at the step S1173 that no traffic backup is causing, the controller 1130 decides that the encountering danger condition is Pattern 15. Since it is supposed that the danger condition in Pattern 15 is caused by executing quick braking on a straight uphill and by starting the vehicle without any problem as shown in FIG. 33, the alarm starting distance is determined at 100 m short of the danger point. Then, the controller 1130 stores the danger point and the alarm starting distance in the RAM 1105.

On the other hand, at the step S1174 following to the curved road decision at the step S1171, the controller 1130 decides whether or not an avoidance operation against an obstacle was executed by operating the steering wheel on the basis of the time-series data of the steer angle as is similar to the step S1052.

When the controller 1130 decides at the step S1174 that an avoidance operation was executed to avoid an obstacle, the controller 1130 decides that the encountering danger condition is Pattern 16. Since it is supposed that the danger condition in Pattern 16 is caused by quickly braking the vehicle on a curved uphill and by avoiding an obstacle as shown in FIG. 33, the alarm starting distance is determined at 300 m short of the danger point. Then, the controller 1130 stores the danger point and the alarm starting distance in the RAM 1105. When the controller 1130 decides at the step S1174 that no avoidance operation was executed, the decision sub-routine proceeds to a step S1175.

At the step S1175, the controller 1130 decides whether traffic backup causes or not on the basis of the time-series data of the vehicle speed after the vehicle passed the danger point as is similar to the step S1053. When the controller 1130 decides at the step S1175 that a traffic backup is causing, the controller 1130 decides that the encountering danger condition is Pattern 17. Since it is supposed that the danger condition in Pattern 17 is caused from starting a traffic backup on a curved uphill as shown in FIG. 33, the alarm starting distance is determined at 200 m short of the danger point. Then, the controller 1130 stores the danger point and the alarm starting distance in the RAM 1105.

When the controller 1130 decides at the step S1165 that no traffic backup is causing, the controller 1130 decides that the encountering danger condition is Pattern 18. Since it is supposed that the danger condition in Pattern 18 is caused by executing quick braking on a curved uphill and by starting the vehicle without any problem as shown in FIG. 33, the alarm starting distance is determined at 200 m short of the danger point. Then, the controller 1130 stores the danger point and the alarm starting distance in the RAM 1105.

With the thus arranged eleventh embodiment according to the present invention, the navigation system comprises the acceleration sensor 101 which detects the longitudinal acceleration of the vehicle and is arranged to analyze a cause of a danger condition on the basis of the vehicle speed, the traveled locus, the steer angle, and the slope ratio when the acceleration (deceleration) detected by the acceleration sensor 101 is greater than the predetermined threshold. Further, the navigation system is arranged to vary the alarm starting distance according to danger condition and to store the detected position of the danger point and the alarm starting distance thereof in the RAM 1105. When the vehicle approaches an area including the stored position, the navigation system displays the danger point in the display 108 and alarms the driver this content. These arrangements of the tenth embodiment enables the navigation system to produce optimum information by each vehicle and to provide optimum information fitted with a driving ability of a driver of the vehicle. Consequently, the navigation system outputs an alarm to the driver at a suitable timing.

Although the eleventh embodiment has been shown and described to employ a ROM for storing the altitude data as the altimeter 1117, it will be understood that a barometric altimeter for detecting altitude on the basis of barometric pressure, a 3D type GPS receiver capable of obtaining the altitude data on the basis of 3D measurement information sent from GPS measurement satellites or a clinometer for detecting road slope data from the inclination of the vehicle.

Twelfth Embodiment

The navigation system of a twelfth embodiment is arranged such that the basic construction of the navigation system is the same as that of the first embodiment, and therefore the explanation thereof is omitted herein. The twelfth embodiment is characteristically arranged to execute a step S1204 instead of the step S104 of the first embodiment. The step S1204 includes the following processes:

To read a vehicle speed form the vehicle speed sensor 102 to the CPU.

To previously calculate the braking distance at the time when the vehicle is braked from the present vehicle speed according to the relationship shown in FIG. 2.

To correct the calculated braking distance into a new reference distance by adding a predetermined reference distance to the previously calculated braking distance.

To calculate a distance between the present position of the vehicle and the danger point read at the step S102.

To decide whether the distance to the danger point is shorter than the new reference distance.

It will be understood that it may be arranged to vary the reference distance according to the calculated braking distance.

As a result, it becomes possible to correct the point for starting alarm according to the present vehicle speed, the navigation system can always supply the alarm information to the driver at a timing enabling safety braking with respect to the danger point.

Although the twelfth embodiment has been described to employ the step S1104 instead of the step S104 in the first embodiment, it will be understood that the step 1104 may be employed to the second to ninth embodiments instead of the step S104 of the flowcharts of FIGS. 2, 10, 12, 13, 15, 17, 19, 21 and 23 as is similar to the first embodiment. These modifications of the second to ninth embodiments will also ensure the advantaged gained by the twelfth embodiment.

Thirteenth Embodiment

The navigation system of a thirteenth embodiment is arranged such that the basic construction of the navigation system is the same as that of the tenth embodiment, and therefore the explanation thereof is omitted herein. The thirteenth embodiment is characteristically arranged to execute a step S1304 instead of the step S1004 shown in the flowchart of FIG. 28 in the tenth embodiment. The step S1304 includes the following processes:

To read a vehicle speed form the vehicle speed sensor 102 to the CPU 1006.

To previously calculate the braking distance at the time when the vehicle is braked from the present vehicle speed according to the relationship shown in FIG. 2.

To correct the alarm starting distance into a new alarm starting distance by adding a predetermined reference distance to the previously calculated braking distance.

To calculate a distance between the present position of the vehicle and the danger point read at the step S1002.

To decide whether the distance to the danger point is shorter than the new alarm starting distance.

It will be understood that it may be arranged to vary the new alarm starting distance according to the calculated braking distance.

As a result, it becomes possible to correct the point for starting alarm according to the present vehicle speed, and therefore the navigation system can always supply the alarm information to the driver at a timing enabling safety braking with respect to the danger point.

Although the thirteenth embodiment has been described to employ the step S1304 instead of the step S1004 in the tenth embodiment, it will be understood that the step 1304 may be employed to the eleventh embodiments instead of the step S1004 of the flowchart of FIG. 32 as is similar to the first embodiment. These modifications of the second to ninth embodiments will also ensure the advantaged gained by the twelfth embodiment.

The entire contents of Japanese Patent Application No. 2000-037159 filed on Feb. 15, 2000 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. For example, the information system according to the present invention may be used independently from a navigation system so as to simply inform a danger point to a driver by means of alarm information through a display or a speaker. The scope of the invention is defined with reference to the following claims.

What is claimed is:
1. An information system for a vehicle comprising:
   a position detector that detects a position of the vehicle with respect to the Earth;
   a traveling circumstance detector that detects circumstantial information of the vehicle; and
   a controller connected to said position detector and said traveling circumstance detector, said controller being arranged
      to decide whether a quantity indicative of the circumstantial information of the vehicle is greater than a circumstance threshold,
      to store the position of the vehicle as a stored point when said controller decides that the quantity indicative of the circumstantial information is greater than the circumstance threshold,
      to decide whether a distance between the position of the vehicle and the stored point is shorter than a predetermined distance, and
      to output information indicative that the vehicle approaches the stored point when said controller decides that the distance is shorter than the predetermined distance.

2. The information system as claimed in claim 1, wherein the circumstantial information detected by said traveling circumstance detector includes a longitudinal acceleration of the vehicle.

3. The information system as claimed in claim 2, wherein said controller is further arranged to estimate a kind of a road traveled by the vehicle, the traveling circumstance threshold being varied according to the kind of the traveling road.

4. The information system as claimed in claim 1, wherein the circumstantial information detected by said traveling circumstance detector includes a lateral acceleration of the vehicle.

5. The information system as claimed in claim 4, wherein said controller is further arranged to estimate a kind of a road traveled by the vehicle, the traveling circumstance threshold being varied according to the kind of the traveling road.

6. The information system as claimed in claim 5, wherein the kind of the traveling road is classified according to a surface condition of the road.

7. The information system as claimed in claim 4, further comprising a slope angle detector that detects a lateral slope angle of a traveling road of the vehicle, the traveling circumstance threshold being varied according to the lateral slope angle of the traveling road.

8. The information system as claimed in claim 1, wherein the circumstantial information detected by said traveling circumstance detector includes a variation of a depression quantity of a brake pedal.

9. The information system as claimed in claim 1, wherein the circumstantial information detected by said traveling circumstance detector includes a variation of a depression quantity of a brake pedal and a variation of a depression amount of an accelerator pedal, said controller deciding whether the variation of the depression quantity of the brake pedal is greater than a first predetermined threshold and whether the variation of the depression quantity of the accelerator pedal is greater than a second predetermined threshold.

10. The information system as claimed in claim 1, wherein the circumstantial information detected by said traveling circumstance detector includes a variation of a steer angle of the vehicle.

11. The information system as claimed in claim 1, further comprising a vehicle speed detector connected to said controller, said controller being arranged to vary the predetermined distance on the basis of the vehicle speed.

12. The information system as claimed in claim 1, further comprising a vehicle speed detector that detects a vehicle speed of the vehicle, said controller being further arranged to store a traveled locus of the vehicle, to store a variation of a steer angle of the vehicle, to identify the stored point on the basis of the vehicle speed, the traveled locus and the steer angle, and to vary the predetermined distance on the basis of the identified stored point.

13. The information system as claimed in claim 12, further comprising a road slope detector that detects a slope of the traveling road of the vehicle, said controller identifying the stored point on the basis of the vehicle speed, the traveled locus, the steer angle and the road slope.

14. The information system as claimed in claim 1, wherein the circumstantial information detected by said traveling circumstance detector includes the operating state of an antilock braking system controller installed to the vehicle.

15. The information system as claimed in claim 1, wherein said traveling circumstance detector includes a heartbeat sensor attached to a driver.

16. An information system for a vehicle comprising:
   a controller arranged
      to ascertain a position of the vehicle with respect to the Earth,
      to ascertain circumstantial information of the vehicle,
      to decide whether a quantity indicative of the circumstantial information is greater with a circumstance threshold, to store the position of the vehicle as a stored point when said controller decides that the quantity indicative of the circumstantial information is greater than the circumstance threshold, to decide whether a distance between the position of the vehicle and the stored point is shorter than a predetermined distance, and to output information indicative that the vehicle approaches the stored point when said controller decides that the distance is shorter than the predetermined distance.

17. A method of informing a position to a driver of a vehicle, said method comprising:

deciding whether a quantity indicative of circumstantial information of the vehicle is greater with a circumstance threshold;

storing a position of the vehicle with respect to the Earth as a stored point when the quantity indicative of the circumstantial information is greater than the circumstance threshold;

deciding whether a distance between the position of the vehicle and the stored point is shorter than a predetermined distance; and outputting information indicative that the vehicle approaches the stored point when the distance is shorter than the predetermined distance.

18. An information system for a vehicle, comprising:

position detecting means for detecting a position of the vehicle;

traveling circumstance detecting means for detecting traveling circumstantial information of the vehicle;

comparing means for comparing the traveling circumstantial information of the vehicle with a traveling circumstance threshold;

storing means for storing the position of the vehicle as a stored point when said comparing means decides that the traveling circumstantial information is greater than the traveling circumstance threshold;

approach deciding means for deciding whether a distance between the position of the vehicle and the stored point is shorter than a predetermined distance; and informing means for outputting information indicative that the vehicle approaches the stored point when said approach deciding means decides the distance is shorter than the predetermined distance.

19. An information system for a vehicle, the vehicle having an antilock braking system, said information system comprising:

position detecting means for detecting a position of the vehicle;

ABS operation detecting means for detecting that the ABS is put in an operative condition at the position detected by said position detecting means;

storing means for storing the position of the vehicle as a stored point when said ABS operation detecting means decides that the ABS is put in an operative condition;

approach deciding means for deciding whether a distance between the position of the vehicle and the stored point is shorter than a predetermined distance; and informing means for outputting information indicative that the vehicle approaches the stored point when said approach deciding means decides the distance is shorter than the predetermined distance.

20. An alarming point storing system for a vehicle comprising:

a position detector that detects a position of the vehicle with respect to the Earth;

a traveling circumstance detector that detects circumstantial information of the vehicle; and a controller connected to said position detector and said traveling circumstance detector, said controller being arranged to decide whether a quantity indicative of the circumstantial information of the vehicle is greater than a circumstance threshold, to store the position of the vehicle as an alarming point when said controller decides that the quantity indicative of the circumstantial information is greater than the circumstance threshold.

* * * * *